(12) United States Patent
Toba et al.

(10) Patent No.: US 8,230,118 B2
(45) Date of Patent: Jul. 24, 2012

(54) INTERFACE CIRCUIT AND VIDEO APPARATUS

(75) Inventors: Kazuaki Toba, Kanagawa (JP); Gen Ichimura, Tokyo (JP); Kenichi Saito, Kanagawa (JP)

(73) Assignee: Sony Corporation (JP)

( * ) Notice: Subject to any disclaimer, the term of this patent is extended or adjusted under 35 U.S.C. 154(b) by 231 days.

(21) Appl. No.: 12/586,587

(22) Filed: Sep. 24, 2009

(65) Prior Publication Data

US 2010/0085482 A1    Apr. 8, 2010

(30) Foreign Application Priority Data

Sep. 26, 2008   (JP) ................................ P2008-249231

(51) Int. Cl.
 *G06F 3/00* (2006.01)
 *G06F 13/00* (2006.01)
(52) U.S. Cl. .......... 710/5; 710/2; 710/8; 710/33; 710/52
(58) Field of Classification Search .................. None
 See application file for complete search history.

(56) References Cited

U.S. PATENT DOCUMENTS

| 2002/0056081 A1 | 5/2002 | Morley et al. |
| 2003/0014543 A1* | 1/2003 | Levy et al. ................... 709/248 |
| 2005/0195894 A1* | 9/2005 | Kim et al. ................... 375/232 |
| 2007/0230909 A1 | 10/2007 | Mukaide et al. |

FOREIGN PATENT DOCUMENTS

| JP | 2002-204272 A | 7/2002 |
| JP | 2003-523653 A | 8/2003 |
| JP | 2007-267116 A | 10/2007 |
| JP | 2007-311884 A | 11/2007 |
| WO | 2009139386 A1 | 11/2009 |

OTHER PUBLICATIONS

Wide Bandwidth Differential Signal HDMI Switch, 2005, Fairchild Semiconductor Corporation, [online, accessed on Jul. 11, 2011], URL: http://www.fairchildsemi.com/ds/FS/FSHDMI04.pdf.*
European Search Report EP 09171069 dated Jun. 14, 2010.

* cited by examiner

*Primary Examiner* — Scott Sun
(74) *Attorney, Agent, or Firm* — Lerner, David, Littenberg, Krumholz & Mentlik, LLP

(57) ABSTRACT

An interface circuit includes: a first transmitting section transmitting a first signal as an in-phase signal to an external device through a transmission path; and a second transmitting section transmitting a clock signal, which is synchronized with the first signal to be transmitted by the first transmitting section, as a differential signal to the external device through the transmission path.

5 Claims, 25 Drawing Sheets

FIG.5

HDMI PIN ARRANGEMENT (TYPE-A)

| PIN | Signal Assignment | PIN | Signal Assignment |
|---|---|---|---|
| 1 | TMDS Data2+ | 2 | TMDS Data2 Shield |
| 3 | TMDS Data2− | 4 | TMDS Data1+ |
| 5 | TMDS Data1 Shield | 6 | TMDS Data1− |
| 7 | TMDS Data0+ | 8 | TMDS Data0 Shield |
| 9 | TMDS Data0− | 10 | TMDS Clock+ |
| 11 | TMDS Clock Shield | 12 | TMDS Clock− |
| 13 | CEC | 14 | Reserved (N.C. on device) |
| 15 | SCL | 16 | SDA |
| 17 | DDC/CEC Ground | 18 | +5V Power |
| 19 | Hot Plug Detect | | |

FIG.9

| PREAMBLE | CHANNEL CODING | | |
|---|---|---|---|
| | | SUBFRAME #1, BLOCK START | |
| "B" | 11101000 | 00010111 | |
| | | SUBFRAME #1 | |
| "M" | 11100010 | 00011101 | |
| | | SUBFRAME #2 | |
| "W" | 11100100 | 00011011 | |
| | 0 | 1 | |
| | (PREVIOUS STATE) | | |

FIG. 10

| | 0 | 1 | 2 | 3 | 4 | 5 | 6 | 7 |
|---|---|---|---|---|---|---|---|---|
| 0 | "CONSUMER USE" | "LINER PCM" | COPYRIGHT INFORMATION | ADDITIONAL FORMAT INFORMATION | | | "MODE 0" | |
| 1 | CATEGORY CODE | | | | | | | |
| 2 | SOURCE NUMBER | | | | CHANNEL NUMBER | | | |
| 3 | SAMPLING FREQUENCY | | | | CLOCK ACCURACY | | | |
| 4 | WORD LENGTH | | | | ORIGINAL SAMPLING FREQUENCY | | | |
| 5 | [BI-DIRECTION] | [ENCRYPTION] | | | | | | |
| 6 | | | | | | | | |
| 7 | | | | | | | | |
| ⋯ | | | | | | | | |
| 20 | | | | | | | | |
| 21 | | | | | | | | |
| 22 | | | | | | | | |
| 23 | | | | | | | | |

FIG.11A

| 0 | 1 | 2 3 4 | 5 6 7 |
|---|---|---|---|
| "1" | "1" | MODE | ITEM |

FIG.11B

| "1" | NUMBER OF IUs |
|---|---|

FIG.11C

| "1" | CATEGORY CODE (C-CHANNEL BIT 8-14) |
|---|---|

FIG.11D

| "1" | ERROR | USER INFORMATION X | | |
|---|---|---|---|---|
| "1" | ERROR | X | USER INFORMATION Y | |
| "1" | ERROR | Y | | USER INFORMATION Z |
| "1" | ERROR | Z | | |

FIG.14
| MODE | 14TH PIN | 19TH PIN |
|---|---|---|
| (HDMI) | RESERVE | HPD |
| ETHERNET | RESERVE + ETHERNET | HPD - ETHERNET |
| SPDIF | RESERVE + SPDIF + CLK | HPD + SPDIF - CLK |
| ETHERNET+SPDIF | RESERVE + ETHERNET + SPDIF | HPD - ETHERNET + SPDIF |
FIG.15
CEC DATA STRUCTURE
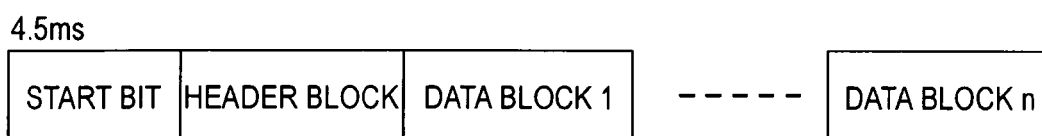
FIG.16
HEADER BLOCK DATA STRUCTURE
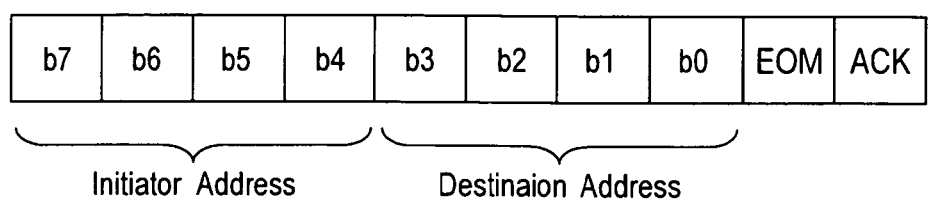

FIG.17

Logical Address

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Recording Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

INTERFACE CIRCUIT AND VIDEO APPARATUS

CROSS-REFERENCE TO RELATED APPLICATION

The present application claims priority from Japanese Patent Application No. JP 2008-249231 filed in the Japanese Patent Office on Sep. 26, 2008, the entire content of which is incorporated herein by reference.

BACKGROUND OF THE INVENTION

1. Field of the Invention

The present invention relates to an interface circuit and a video apparatus. In particular, the present invention relates to an interface circuit which improves the signal transmission quality by transmitting a clock signal as a differential signal at the time of signal transmission, such as audio data or the like, as in-phase signals, or the like.

2. Description of the Related Art

In recent years, with the spread of AV (Audio/Visual) devices which treat digital signals, such as sound signals or video signals, various types of interfaces have been suggested to transmit digital signals between the AV devices. With regard to such interfaces, for example, the IEEE (Institute of Electrical and Electronics Engineers) 1394 standard, the HDMI (High-Definition Multimedia Interface) standard (HDMI is Registered Trademark), and the like are widely known (for example, see JP-A-2007-267116).

In a comparatively large-scale system, a technique is suggested which distributes digital signals using Ethernet (Registered Trademark) (for example, see JP-T-2003-523653).

When Ethernet is used for connection between the AV devices, two-way communication based on the Internet protocol (IP) is performed. For this reason, software processing takes time, and the real time property is lacking. In order to resolve this problem, it will be necessary to synchronize the AV devices with each other, but a large buffer will be provided to adjust the speed. Further, a processing will be performed in which a time stamp is sent from the transmission side and a clock as reference is regenerated on the reception side. This processing may cause jitter (the clock becomes unstable) or signal delay.

The SPDIF (Sony Philips Digital InterFace) is known as one of the interfaces. The SPDIF is an interface which is used to transmit digital audio signals, and is standardized by "IEC 60958" of the IEC (International Electrotechnical Commission).

FIG. 28 shows a general configuration example of a receiver 600 of an audio transmission system using the SPDIF. An SPDIF signal is serial data which is bi-phase mark modulated. A transmission clock can be extracted from the edge of serial data by using a PLL (Phase-Locked Loop) circuit.

Referring to FIG. 28, the receiver 600 has an amplifier 601, a PLL circuit 602, a data extraction unit 603, a data decoder 604, and an A/D converter 605. In the PLL circuit 602, a clock signal CLK which is synchronized with the SPDIF signal is generated on the basis of the SPDIF signal which is input through the amplifier 601. In the data extraction unit 603, data is extracted from the SPDIF signal which is input through the amplifier 601 on the basis of the clock signal CLK generated by the PLL circuit 602.

The data decoder 604 decodes data extracted by the data extraction unit (serial data which is bi-phase mark modulated), so audio data is decoded. The A/D converter 605 A/D converts audio data obtained by the data decoder 604 on the basis of the clock signal CLK generated by the PLL circuit 602 to obtain an analog sound signal Aout.

SUMMARY OF THE INVENTION

The quality of the analog sound signal Aout which is obtained by the receiver 600 which receives the SPDIF signal is influenced by time axis fluctuation (jitter) which is included in the input SPDIF signal, the performance of the PLL circuit 602 in the receiver 600, and the like.

Thus, it is desirable to improve the signal transmission quality.

An embodiment of the invention is directed to an interface circuit. The interface circuit includes a first transmitting section transmitting a first signal as an in-phase signal to an external device through a transmission path, and a second transmitting section transmitting a clock signal, which is synchronized with the first signal to be transmitted from the first transmitting section, as a differential signal to the external device through the transmission path.

In this embodiment, the first transmitting section transmits the first signal as an in-phase signal to the external device through the transmission path. For example, the transmission path may have a pair of lines which constitute an HDMI cable, and at least one of the pair of lines may have a function to notify the connection state of the external device by a direct-current bias potential. Specifically, a pair of lines may be, for example, a reserve line and an HPD (Hot Plug Detect) line which constitute the HDMI cable.

The second transmitting section transmits the clock signal synchronized with the first signal to be transmitted by the first transmitting section as a differential signal to the external device through the transmission path. In this case, while the first signal is transmitted as an in-phase signal, the clock signal is transmitted as a differential signal. Therefore, even if transmission is performed using the same transmission line, the external device can satisfactorily separate and extract the first signal and the clock signal by an arithmetic operation.

As described above, the first signal and the clock signal synchronized with the first signal are transmitted together to the external device, so even if there is a time axis fluctuation (jitter) in the first signal, the external device can correctly extract data from the first signal on the basis of the clock signal and the signal transmission quality can be improved. Since the first signal and the clock signal synchronized with the first signal are transmitted together to the external device, the external device will not need to reproduce the clock signal synchronized with the first signal by using a PLL circuit, and there will be no influence by jitter due to the PLL circuit.

The external device will not need to reproduce the clock signal synchronized with the first signal by using the PLL circuit, so the transmission rate will not be limited by the PLL circuit, and the first signal can be transmitted at a higher rate. Further, the clock signal is transmitted as a differential signal to the external device through the transmission path. Therefore, high-quality transmission becomes possible, and even a high-frequency signal can be prevented from being influenced by EMI (Electro-Magnetic Interference) or the like.

The interface circuit may further include a transmitting/receiving section transmitting the second signal as a differential signal to the external device through the transmission path and processing a differential signal, which is received from the external device through the transmission path, so as to receive the second signal. The second transmitting section may transmit the clock signal when the transmitting/receiving section does not transmit or receive the second signal. The clock signal is transmitted as a differential signal to the external device through the transmission path, like the second signal. However, the clock signal is transmitted when the second signal is not transmitted/received, so there will be no influence, such as interruption of the transmission/reception of the second signal, or the like.

Another embodiment of the invention is directed to an interface circuit. The interface circuit includes a first receiving section processing an in-phase signal, which is received from an external device through a transmission path, so as to receive a first signal, and a second receiving section processing a differential signal, which is received from the external device through the transmission path, so as to receive a clock signal, which is synchronized with the first signal to be received by the first receiving section.

In this embodiment, the first receiving section processes the in-phase signal, which is received from the external device through the transmission path, so as to receive the first signal. For example, the transmission path may have a pair of lines which constitute an HDMI cable, and at least one of the pair of lines may have a function to notify the connection state of the external device by a direct-current bias potential. Specifically, a pair of lines may be, for example, a reserve line and an HPD (Hot Plug Detect) line which constitute an HDMI cable.

The second receiving section processes the differential signal, which is received from the external device through the transmission path, so as to receive the clock signal, which is synchronized with the first signal to be received by the first receiving section. In this case, as described above, while the first signal is transmitted as an in-phase signal from the external device, the clock signal is transmitted as a differential signal from the external device. Therefore, the first signal and the clock signal can be satisfactorily separated and extracted by an arithmetic operation.

As described above, the first signal and the clock signal synchronized with the first signal are received from the external device together, so even if there is a time axis fluctuation (jitter) in the first signal, data can be correctly extracted from the first signal on the basis of the clock signal and the signal transmission quality can be improved. Since the first signal and the clock signal synchronized with the first signal are transmitted from the external device together, it will be not necessary to reproduce the clock signal synchronized with the first signal by using the PLL circuit, and there will be no influence by jitter due to the PLL circuit.

Since it will not be necessary to reproduce the clock signal synchronized with the first signal by using the PLL circuit, the transmission rate will not be limited by the PLL circuit, and the first signal can be transmitted at a higher rate. Further, the clock signal is received as a differential signal from the external device through the transmission path. Therefore, high-quality reception becomes possible, and even a high-frequency signal can be prevented from being influenced by EMI or the like.

The interface circuit may further include a transmitting/receiving section transmitting a second signal as a differential signal to the external device through the transmission path and processing a differential signal, which is received from the external device through the transmission path, so as to receive the second signal. The second receiving section may receive the clock signal when the transmitting/receiving section does not transmit or receive the second signal. The clock signal is received as a differential signal from the external device through the transmission path, like the second signal. However, the clock signal is received when the second signal is not transmitted/received, so there will be no influence, such as interruption of the transmission/reception of the second signal, or the like.

Yet another embodiment of the invention is directed to an interface circuit. The interface circuit includes a first receiving section processing a differential signal, which is received from an external device through a transmission path, so as to receive a clock signal, and a first transmitting section transmitting a first signal, which is synchronized with the clock signal to be received by the first receiving section, as an in-phase signal to the external device through the transmission path.

In this embodiment, the first receiving section processes the differential signal, which is received from the external device through the transmission path, so as to receive the clock signal. For example, the transmission path may have a pair of lines which constitute an HDMI cable, and at least one of the pair of lines may have a function to notify the connection state of the external device by a direct-current bias potential. Specifically, a pair of lines may be, for example, a reserve line and an HPD (Hot Plug Detect) line which constitute an HDMI cable.

The first transmitting section transmits the first signal, which is synchronized with the clock signal to be received by the first receiving section, as an in-phase signal to the external device through the transmission path. In this case, as described above, while the first signal is transmitted as an in-phase signal to the external device, the clock signal is transmitted as a differential signal from the external device. Therefore, the clock signal can be satisfactorily separated and extracted by an arithmetic operation.

As described above, the first signal synchronized with the clock signal received from the external device is transmitted to the external device. For this reason, the external device can correctly extract data from the received first signal on the basis of the clock signal thereof, and the signal transmission quality is improved. The external device will not need to reproduce the clock signal synchronized with the first signal by using the PLL circuit, and there will be no influence by jitter due to the PLL circuit. The transmission rate will not be limited by the PLL circuit, and the first signal can be transmitted at a higher rate. Further, the clock signal is transmitted as a differential signal from the external device through the transmission path. Therefore, high-quality reception becomes possible, and even a high-frequency signal can be prevented from being influenced by EMI or the like.

The interface circuit may further include a transmitting/receiving section transmitting a second signal as a differential signal to the external device through the transmission path and processing a differential signal, which is received from the external device through the transmission path, so as to receive the second signal. The first receiving section may receive the clock signal when the transmitting/receiving section does not transmit or receive the second signal. The clock signal is received as a differential signal from the external device through the transmission path, like the second signal. However, the clock signal is received when the second signal is not transmitted/received, so there will be no influence, such as interruption of the transmission/reception of the second signal, or the like.

Yet another embodiment of the invention is directed to an interface circuit. The interface circuit includes a transmitting section transmitting a clock signal as a differential signal to an external device through a transmission path, and a receiving section processing an in-phase signal, which is received from the external device through the transmission path, so as to receive a first signal, which is synchronized with a clock signal to be transmitted from the transmitting section.

In this embodiment, the receiving section processes the in-phase signal, which is received from the external device through the transmission path, so as to receive the first signal. For example, the transmission path may have a pair of lines which constitute an HDMI cable, and at least one of the pair of lines may have a function to notify the connection state of the external device by a direct-current bias potential. Specifically, a pair of lines may be, for example, a reserve line and an HPD (Hot Plug Detect) line which constitute the HDMI cable.

The transmitting section transmits the clock signal, which is synchronized with the first signal to be received by the receiving section, as a differential signal to the external device through the transmission path. In this case, as described above, while the first signal is transmitted as an in-phase signal from the external device, the clock signal is transmitted as a differential signal to the external device. Therefore, the external device can satisfactorily separate and extract the clock signal by an arithmetic operation.

As described above, the clock signal is transmitted to the external device. For this reason, the external device can transmit the first signal in synchronization with the received clock signal. In this case, since the first signal received from the external device is synchronized with the clock signal transmitted to the external device, data can be correctly extracted from the received first signal on the basis of the clock signal, and the signal transmission quality is improved. When this happens, it will not be necessary to reproduce the clock signal synchronized with the first signal by using the PLL circuit, and there will be no influence by jitter due to the PLL circuit. The transmission rate of the PLL circuit will not be limited by the PLL circuit, and the first signal can be transmitted at a higher rate. Further, the clock signal is received as a differential signal from the external device through the transmission path, so high-quality reception becomes possible, and even a high-frequency signal can be prevented from being influenced by EMI or the like.

The interface circuit may further include a transmitting/receiving section transmitting a second signal as a differential signal to the external device through the transmission path and processing a differential signal, which is received from the external device through the transmission path, so as to receive the second signal. The transmitting section may transmit the clock signal when the transmitting/receiving section does not transmit or receive the second signal. The clock signal is transmitted as a differential signal from the external device through the transmission path, like the second signal. However, the clock signal is transmitted when the second signal is not transmitted/received, so there will be no influence, such as interruption of the transmission/reception of the second signal, or the like.

According to the embodiments of the invention, when a signal is transmitted as an in-phase signal, a clock signal is transmitted as a differential signal. As a result, the signal transmission quality can be improved.

BRIEF DESCRIPTION OF THE DRAWINGS

FIG. 5 is a diagram showing the pin arrangement (type A) of HDMI terminals.

FIG. 9 is a diagram showing preamble channel coding based on the SPDIF standard.

FIG. 10 is a diagram showing the format of a channel status based on the SPDIF standard.

FIGS. 11A to 11D are diagrams showing the format of user data based on the SPDIF standard.

FIG. 14 is a diagram showing the operation using a reserve line and an HPD line according to an embodiment as a whole.

FIG. 15 is a diagram showing the structure of CEC data which is transmitted through a CEC line.

FIG. 16 is a diagram showing a structure example of a header block.

FIG. 17 is a diagram showing logical addresses which are set in accordance with the type of HDMI device.

DETAILED DESCRIPTION OF THE INVENTION

Hereinafter, the best mode for carrying out the invention (hereinafter, referred to as "embodiment") will be described. The description will be made in the following order.

1. First Embodiment (unidirectional SPDIF and clock transmission from transmission side)
2. Second Embodiment (unidirectional SPDIF and clock transmission from reception side)
3. Third Embodiment (bi-directional SPDIF and clock transmission from transmission side)
4. Modification 1. First Embodiment

[Configuration Example of AV System]

Figure 1:
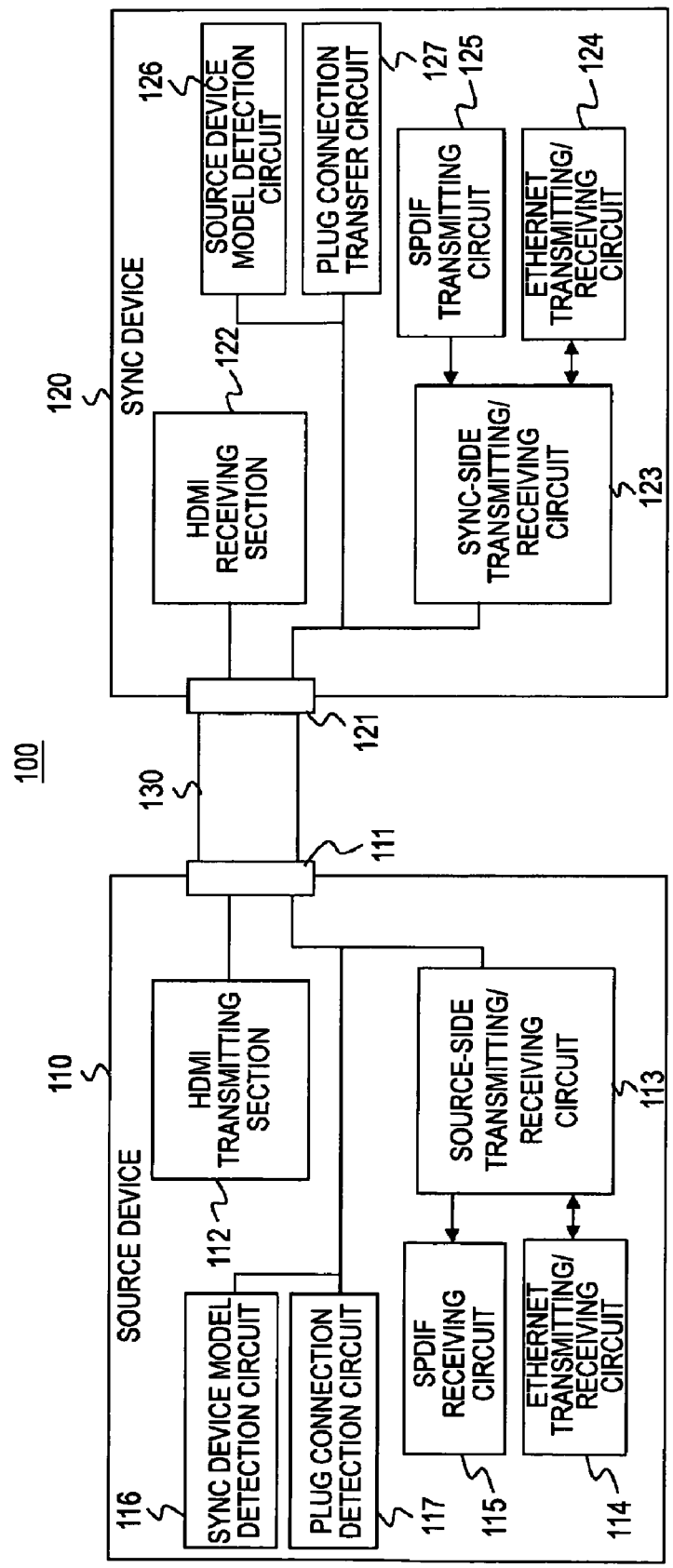
FIG. 1 is a block diagram showing a configuration example of an AV system according to a first embodiment.

FIG. 1 shows a configuration example of an AV system 100 according to an embodiment. The AV system 100 has a source device 110, such as a disk recorder or the like, and a sync device 120, such as a television receiver or the like. In the AV system 100, the source device 110 and the sync device 120 are eHDMI-compatible devices. Note that an eHDMI-compatible device means that a communication section is provided which performs communication using a communication path of a reserve line and an HPD line constituting an HDMI cable.

The source device 110 and the sync device 120 are connected to each other through an HDMI cable 130. That is, the source device 110 has an HDMI terminal 111, and the sync device 120 also has an HDMI terminal 121. One end of the HDMI cable 130 is connected to the HDMI terminal 111 of the source device 110, and the other end of the HDMI cable 130 is connected to the HDMI terminal 121 of the sync device 120.

The source device 110 has an HDMI transmitting section 112, a source-side transmitting/receiving circuit 113, a sync device model detection circuit 116 and a plug connection detection circuit 117, which are connected to the HDMI terminal 111. An Ethernet transmitting/receiving circuit 114 and an SPDIF receiving circuit 115 are connected to the source-side transmitting/receiving circuit 113.

The HDMI transmitting section 112 sends data of baseband video (image) and sound by communication based on the HDMI through the HDMI terminal 111. The details of the HDMI transmitting section 112 will be described below.

The source-side transmitting/receiving circuit 113 interfaces an Ethernet signal, which is transmitted by using the reserve line and the HPD line constituting the HDMI cable 130, between the Ethernet transmitting/receiving circuit 114 and the HDMI cable 130. The source-side transmitting/receiving circuit 113 also interfaces an SPDIF signal, which is transmitted by using the reserve line and the HPD line constituting the HDMI cable 130, between the SPDIF receiving circuit 115 and the HDMI cable 130. The details of the source-side transmitting/receiving circuit 113 will be described.

The SPDIF receiving circuit 115 is a circuit which is used to receive the SPDIF signal. The SPDIF receiving circuit 115 is a receiving circuit based on the SPDIF standard. The details of the SPDIF signal will be described. The Ethernet transmitting/receiving circuit 114 is a circuit which is used to transmit/receive the Ethernet signal, and for example, performs bi-directional communication based on the Internet protocol (IP). In this case, the TCP (Transmission Control Protocol) or the UDP (User Datagram Protocol) may be used as the upper layer of the Internet protocol (IP).

The sync device model detection circuit 116 detects whether the sync device 120 is an eHDMI-compatible device or not through the reserve line of the HDMI cable 130. The plug connection detection circuit 117 compares the potential of a terminal of the HDMI cable 130, which is connected to the HPD line, with a reference potential so as to detect connection of the sync device 120.

The sync device 120 has an HDMI receiving section 122, a sync-side transmitting/receiving circuit 123, a source device model detection circuit 126 and a plug connection transfer circuit 127, which are connected to the HDMI terminal 121. An Ethernet transmitting/receiving circuit 124 and an SPDIF transmitting circuit 125 are connected to the sync-side transmitting/receiving circuit 123.

The HDMI receiving section 122 receives baseband video and sound data, which are transmitted from the source device in one direction, through the HDMI terminal 121 by communication based on the HDMI. The details of the HDMI receiving section 122 will be described.

The sync-side transmitting/receiving circuit 123 interfaces the Ethernet signal, which is transmitted by using the reserve line and the HPD line constituting the HDMI cable 130, between the Ethernet transmitting/receiving circuit 124 and the HDMI cable 130. The sync-side transmitting/receiving circuit 123 also interfaces the SPDIF signal, which is transmitted by using the reserve line and the HPD line constituting the HDMI cable 130, between the SPDIF transmitting circuit 125 and the HDMI cable 130. The details of the sync-side transmitting/receiving circuit 123 will be described.

The SPDIF transmitting circuit 125 is a circuit which is used to transmit the SPDIF signal. The SPDIF transmitting circuit 125 is a transmitting circuit based on the SPDIF standard. The Ethernet transmitting/receiving circuit 124 is a circuit which is used to transmit/receive the Ethernet signal, and for example, performs bi-directional communication based on the Internet protocol (IP), like the Ethernet transmitting/receiving circuit 114 of the source device 110.

The source device model detection circuit 126 detects whether the source device 110 is an eHDMI-compatible device or not through the reserve line of the HDMI cable 130. The plug connection transfer circuit 127 biases a terminal of the HDMI cable 130, which is connected to the HPD line, to a predetermined voltage, and transfers an indication that the sync device is connected to the source device 110.

The operation of the AV system 100 shown in FIG. 1 will be described. Video and sound data which should be transmitted from the source device 110 to the sync device 120 is transmitted from the HDMI transmitting section 112 of the source device 110 to the sync device 120 through the HDMI cable 130 by communication based on the HDMI. The HDMI receiving section 122 of the sync device 120 receives video and sound data, which is transmitted from the source device 110 through the HDMI cable 130, by communication based on the HDMI. The sync device 120 performs image display and sound output on the basis of video and sound data obtained as above.

Bi-directional communication based on the Internet protocol (IP), that is, transmission/reception of the Ethernet signal is performed between the Ethernet transmitting/receiving circuit 114 of the source device 110 and the Ethernet transmitting/receiving circuit 124 of the sync device 120 through the HDMI cable 130. The SPDIF signal transmitted from the SPDIF transmitting circuit 125 of the sync device 120 is supplied to the SPDIF receiving circuit 115 of the source device 110 through the HDMI cable 130. The SPDIF receiving circuit 115 performs data extraction, decoding, and the like on the SPDIF signal so as to obtain data, such as audio data or the like.

[Configuration Example of HDMI Transmitting Section, HDMI Receiving Section, and the Like]

Figure 2:
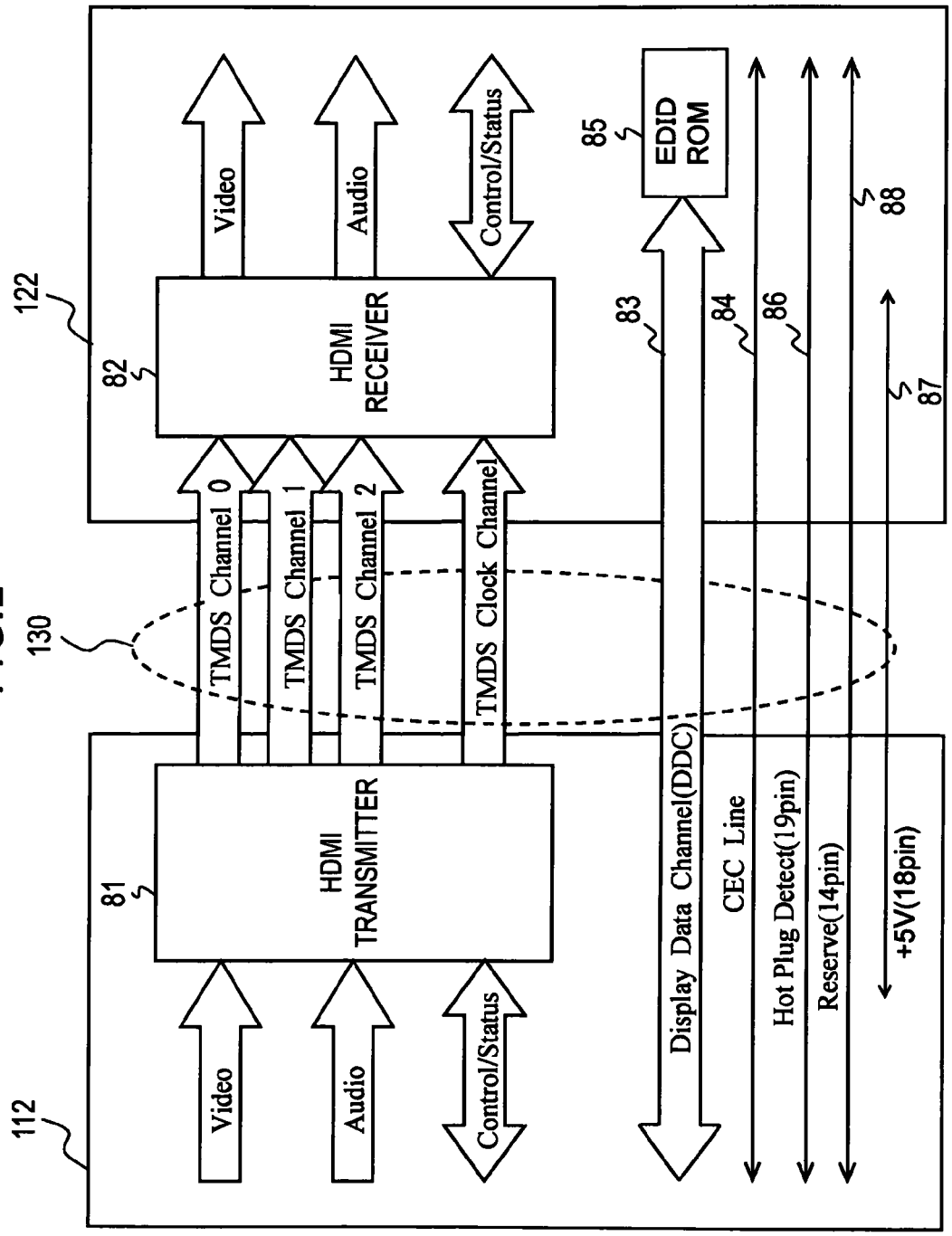
FIG. 2 is a block diagram showing a configuration example of an HDMI transmitting section (HDMI SOURCE) and an HDMI receiving section (HDMI SYNC).

Next, the details of the HDMI transmitting section 112 and the HDMI receiving section 122 will be described. FIG. 2 shows a configuration example of the HDMI transmitting section 112 of the source device 110 and the HDMI receiving section 122 of the sync device 120.

The HDMI transmitting section 112 transmits a differential signal corresponding to pixel data of uncompressed images for one screen to the HDMI receiving section 122 in one direction by a plurality of channels during an effective image period (hereinafter, appropriately referred to as an active video period), which is obtained by removing a horizontal retrace period and a vertical retrace period from a period between one vertical synchronizing signal and the next vertical synchronizing signal, and also transmits a differential signal corresponding to sound data (audio signal), control data, or other auxiliary data at least accompanying image data (video signal) to the HDMI receiving section 122 in one direction by a plurality of channels during the horizontal retrace period or vertical retrace period.

That is, the HDMI transmitting section 112 has a transmitter 81. The transmitter 81 converts pixel data of uncompressed images to a corresponding differential signal and transmits the differential signal in serial to the HDMI receiving section 122, which is connected thereto through the HDMI cable 130, in one direction by a plurality of channels, that is, three TMDS channels #0, #1, and #2.

The transmitter 81 also converts sound data accompanying uncompressed images and further necessary control data and other auxiliary data to a corresponding differential signal and transmits the differential signal in serial to the HDMI receiving section 122, which is connected thereto through the HDMI cable 130, in one direction by the three TMDS channels #0, #1, and #2.

The transmitter 81 transmits a pixel clock, which is synchronized with pixel data to be transmitted by the three TMDS channels #0, #1, and #2, to the HDMI receiving section 122, which is connected thereto through the HDMI cable 130, by a TMDS clock channel. Note that 10 bits of pixel data are transmitted in one clock of the pixel clock by one TMDS channel #i (where i=0, 1, 2).

The HDMI receiving section 122 receives a differential signal corresponding to pixel data, which is transmitted from the HDMI transmitting section in one direction, by a plurality of channels during the active video period, and receives a differential signal corresponding to sound data or control data, which is transmitted from the HDMI transmitting section 112 in one direction, by a plurality of channels during the horizontal retrace period or vertical retrace period.

That is, the HDMI receiving section 122 has a receiver 82. The receiver 82 receives a differential signal corresponding to pixel data and a differential signal corresponding to sound data or control data, which are transmitted in one direction from the HDMI transmitting section 112 connected thereto through the HDMI cable 130, by the TMDS channels #0, #1, and #2 in synchronization with the pixel clock which is transmitted from the HDMI transmitting section 112 by the TMDS clock channel in the same way.

Transmission channels of the HDMI system including the HDMI transmitting section 112 and the HDMI receiving section 122 include, in addition to the three TMDS channels #0 to #2, which are transmission channels for transmitting pixel data and sound data in serial from the HDMI transmitting section 112 to the HDMI receiving section 122 in one direction in synchronization with the pixel clock, and the TMDS clock channel, which is a transmission channel for transmitting the pixel clock, transmission lines, called a DDC (Display Data Channel) 83 and a CEC line 84.

The DDC 83 includes two signal lines (not shown) which are contained in the HDMI cable 130, and is used by the HDMI transmitting section 112 to read E-EDID (Enhanced Extended Display Identification Data) from the HDMI receiving section 122 connected thereto through the HDMI cable 130.

That is, the HDMI receiving section 122 has, in addition to the HDMI receiver 82, an EDID ROM (Read Only Memory) 85 which stores E-EDID, which is performance information regarding performance (configuration/capability) of the HDMI receiving section 122. The HDMI transmitting section 112 reads E-EDID of the HDMI receiving section 122 from the HDMI receiving section 122, which is connected thereto through the HDMI cable 130, through the DDC 83, and recognizes the formats of images, such as RGB, YCbCr 4:4:4, YCbCr 4:2:2, and the like, with which an electronic device having the HDMI receiving section 122 complies, on the basis of E-EDID.

The CEC line 84 includes one signal line (not shown) which is contained in the HDMI cable 130, and is used for bi-directional communication of control data between the HDMI transmitting section 112 and the HDMI receiving section 122.

The HDMI cable 130 also includes an HPD line 86 which is connected to a pin called HPD (Hot Plug Detect). The source device 110 can detect connection of the sync device 120 by using the HPD line 86. The HDMI cable 130 also includes a power line 87 which is used to supply power from the source device to the sync device. Further, the HDMI cable 130 includes a reserve line 88. According to the HDMI standard, the reserve line 88 is not used.

Figure 3:
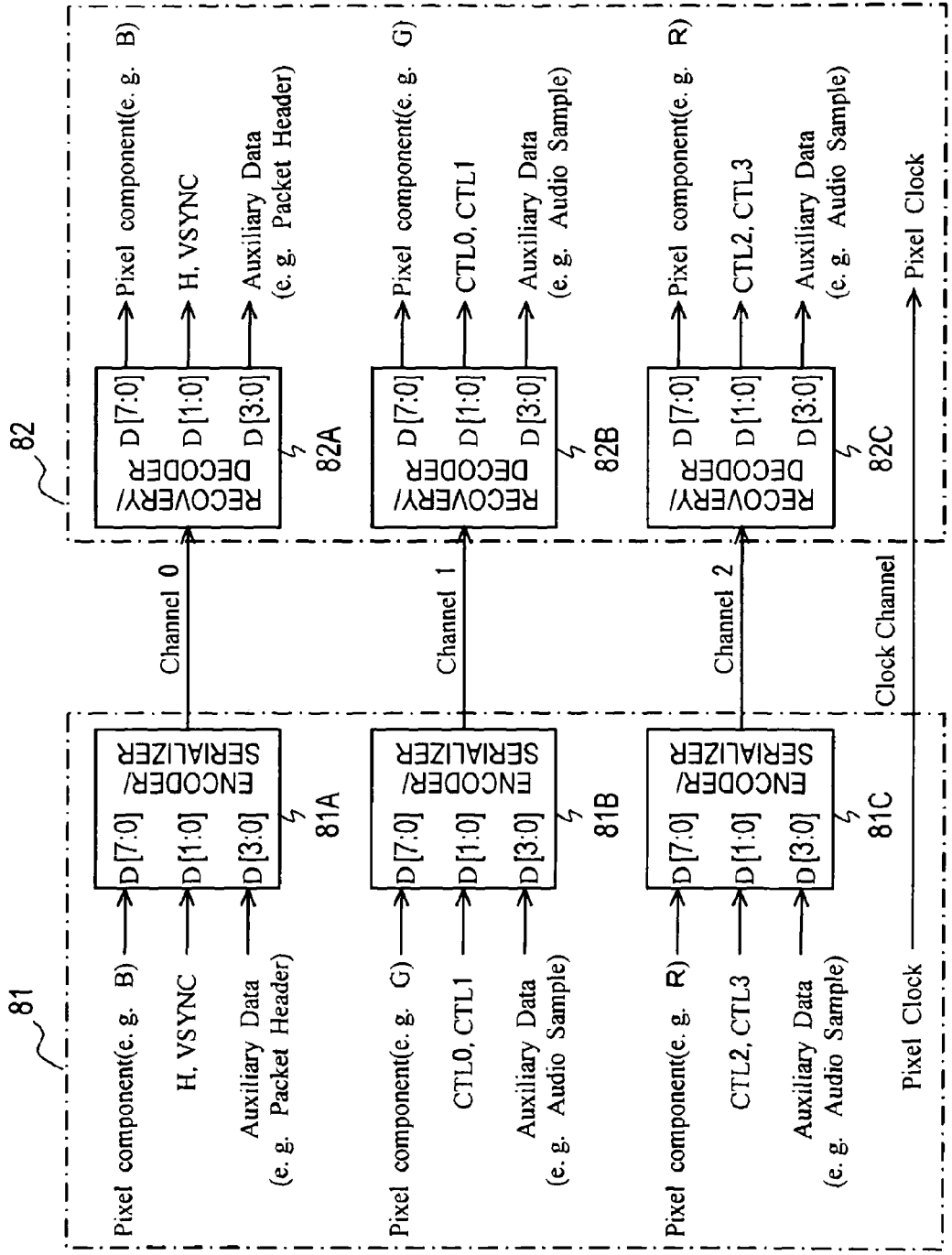
FIG. 3 is a block diagram showing a configuration example of an HDMI transmitter and an HDMI receiver.

FIG. 3 shows a configuration example of the HDMI transmitter 81 and the HDMI receiver 82 of FIG. 2.

The transmitter 81 has three encoders/serializers 81A, 81B, and 81C corresponding to the three TMDS channels #0, #1, and #2. Each of the encoders/serializers 81A, 81B, and 81C encodes image data, auxiliary data, and control data supplied thereto to convert parallel data into serial data for transmission as a differential signal. When image data has, for example, three components of R (red), G (green), and B (blue), the B component is supplied to the encoder/serializer 81A, the G component is supplied to the encoder/serializer 81B, and the R component is supplied to the encoder/serializer 81C.

Auxiliary data includes, for example, sound data and control packets. The control packets are supplied to the encoder/serializer 81A, and sound data is supplied to the encoders/serializers 81B and 81C.

Control data includes a one-bit vertical synchronizing signal (VSYNC), a one-bit horizontal synchronizing signal (HSYNC), and one-bit control bits CTL0, CTL1, CTL2, and CTL3. The vertical synchronizing signal and the horizontal synchronizing signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits the B components of image data, the vertical synchronizing signal and the horizontal synchronizing signal, and auxiliary data supplied thereto in time division mode. That is, the encoder/serializer 81A makes the B components of image data supplied thereto parallel data in 8 bits, which is a fixed number of bits. The encoder/serializer 81A also encodes parallel data to convert parallel data into serial data, and transmits serial data by the TMDS channel #0.

The encoder/serializer 81A encodes two-bit parallel data of the vertical synchronizing signal and the horizontal synchronizing signal supplied thereto to convert parallel data into serial data, and transmits serial data by the TMDS channel #0. The encoder/serializer 81A makes auxiliary data supplied thereto parallel data in 4 bits. The encoder/serializer 81A encodes parallel data to convert parallel data into serial data, and transmits serial data by the TMDS channel #0.

The encoder/serializer 81B transmits the G components of image data, the control bits CTL0 and CTL1, and auxiliary data supplied thereto in time division mode. That is, the encoder/serializer 81B makes the G components of image data supplied thereto parallel data in 8 bits, which is a fixed number of bits. The encoder/serializer 81B encodes parallel data to convert parallel data into serial data and transmits serial data by the TMDS channel #1.

The encoder/serializer 81B encodes two-bit parallel data of the control bits CTL0 and CTL1 supplied thereto to convert parallel data into serial data, and transmits serial data by the TMDS channel #1. The encoder/serializer 81B makes auxiliary data supplied thereto parallel data in 4 bits. The encoder/serializer 81B encodes parallel data to convert parallel data into serial data, and transmits serial data to the TMDS channel #1.

The encoder/serializer 81C transmits the R components of image data, the control bits CTL2 and CTL3, and auxiliary data supplied thereto in time division mode. That is, the encoder/serializer 81C makes the R components of image data supplied thereto parallel data in 8 bits, which is a fixed number of bits. The encoder/serializer 81C encodes parallel data to convert parallel data into serial data, and transmits serial data by the TMDS channel #2.

The encoder/serializer 81C encodes two-bit parallel data of the control bits CTL2 and CTL3 supplied thereto to convert parallel data into serial data, and transmits serial data by the TMDS channel #2. The encoder/serializer 81C makes auxiliary data supplied thereto parallel data in 4 bits. The encoder/serializer 81C encodes parallel data to convert parallel data into serial data, and transmits serial data by the TMDS channel #2.

The receiver 82 has three recovery/decoders 82A, 82B, and 82C corresponding to the three TMDS channels #0, #1, and #2. Each of the recovery/decoders 82A, 82B, and 82C receives image data, auxiliary data, control data transmitted by the TMDS channels #0, #1, and #2 as differential signals. Each of the recovery/decoders 82A, 82B, 82C converts image data, auxiliary data, and control data from serial data into parallel data, and decodes parallel data for output.

That is, the recovery/decoder 82A receives the B components of image data, the vertical synchronizing signal and the horizontal synchronizing signal, and auxiliary data transmitted by the TMDS channel #0 as a differential signal. The recovery/decoder 82A converts the B components of image data, the vertical synchronizing signal and the horizontal synchronizing signal, and auxiliary data from serial data into parallel data, and performs decoding for output.

The recovery/decoder 82B receives the G components of image data, the control bits CTL0 and CTL1, and auxiliary data transmitted by the TMDS channel #1 as a differential signal. The recovery/decoder 82B converts the G components of image data, the control bits CTL0 and CTL1, and auxiliary data from serial data into parallel data, and performs decoding for output.

The recovery/decoder 82C receives the R components of image data, the control bits CTL2 and CTL3, and auxiliary data transmitted by the TMDS channel #2 as a differential signal. The recovery/decoder 82C converts the R components of image data, the control bits CTL2 and CTL3, and auxiliary data from serial data into parallel data, and performs decoding for output.

Figure 4:
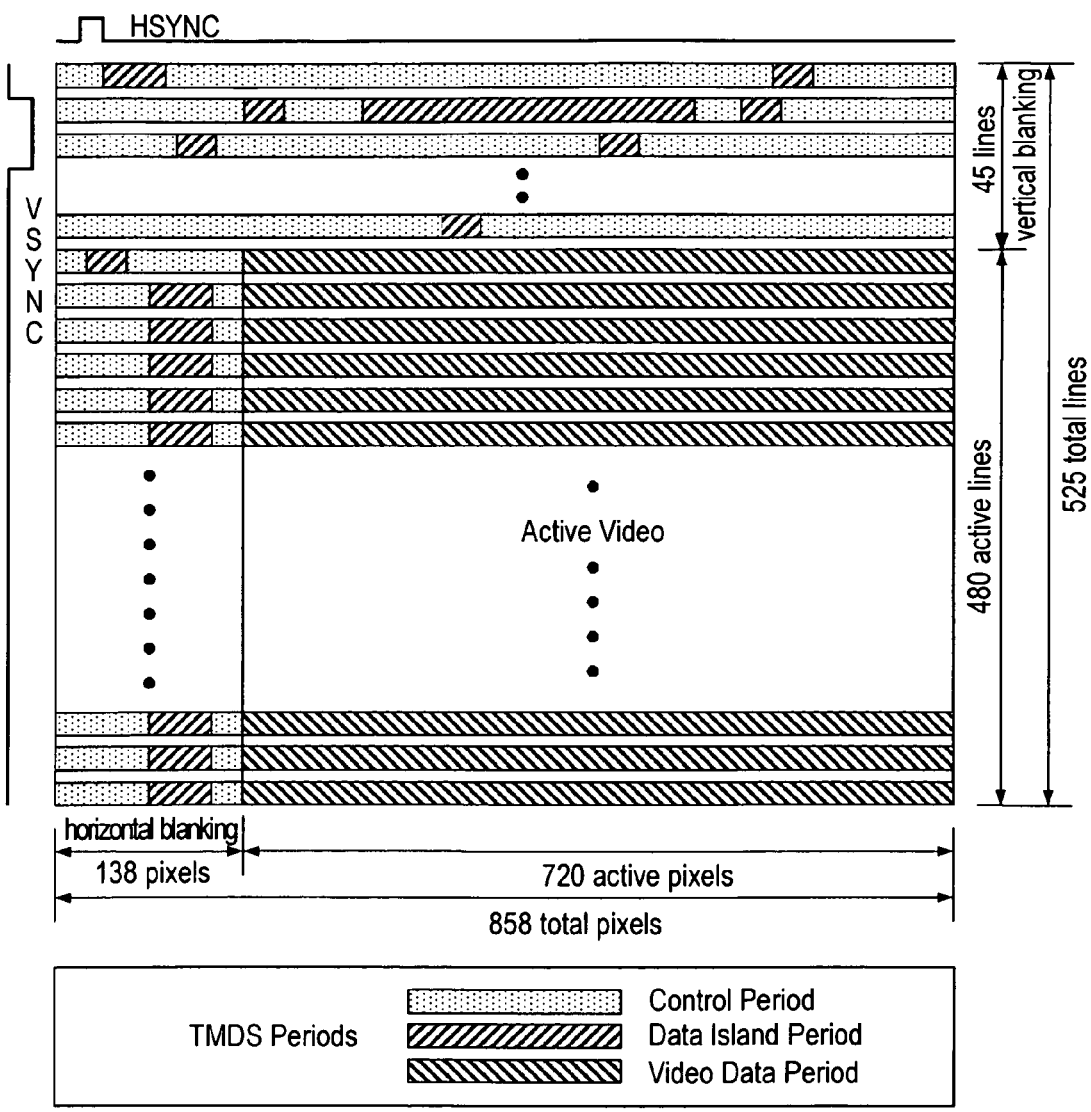
FIG. 4 is a diagram showing the structure of TMDS transmission data.

FIG. 4 shows an example of a transmission period (interval) in which various kinds of transmission data are transmitted by the three TMDS channels #0, #1, and #2 of HDMI. FIG. 4 shows a period of various kinds of transmission data when progressive images of 720×480 pixels horizontally and vertically are transmitted by the TMDS channels #0, #1, and #2.

In a video field by which transmission data is transmitted by the three TMDS channels #0, #1, and #2 of HDMI, three types of period, that is, a video data period, a data island period, and a control period are present depending on the type of transmission data.

The video field period is a period between an active edge of one vertical synchronizing signal and an active edge of the next vertical synchronizing signal, and can be divided into horizontal blanking, vertical blanking, and Active Video, which is obtained by removing the horizontal blanking and the vertical blanking from the video field period.

The video data period is assigned to the Active Video. During the video data period, data of active pixels of 720 pixels×480 lines constituting uncompressed image data for one screen is transmitted.

The data island period and the control period are assigned to the horizontal blanking and the vertical blanking. During the data island period and the control period, auxiliary data is transmitted.

That is, the data island period is assigned to a portion of the horizontal blanking and the vertical blanking. During the data island period, data of auxiliary data not related to control, for example, packets of sound data and the like are transmitted.

The control period is assigned to the other portion of the horizontal blanking and the vertical blanking. During the control period, data of auxiliary data related to control, for example, the vertical synchronizing signal, the horizontal synchronizing signal, the control packets, and the like are transmitted.

The frequency of the pixel clock transmitted by the TMDS clock channel in the current HDMI is, for example, 165 MHz. In this case, the transmission rate of the data island period is about 500 Mbps.

FIG. 5 shows a pin arrangement of an HDMI connector. This pin arrangement is an example of the type A. Two lines serving as differential lines on which TMDS Data#i+ and TMDS Data#i−, which are differential signals of the TMDS channel #i, are transmitted are connected to pins (whose pin numbers are 1, 4, and 7) to which TMDS Data#i+ is assigned and pins (whose pin numbers are 3, 6, and 9) to which TMDS Data#i− is assigned.

The CEC line 84 on which a CEC signal as control data is transmitted is connected to a pin whose pin number is 13, and a pin whose pin number is 14 is a reserve pin. A line on which an SDA (Serial Data) signal, such as E-EDID or the like, is transmitted is connected to a pin whose pin number is 16, and a line on which an SCL (Serial Clock) signal, which is a clock signal used for synchronization at the time of transmission/reception of the SDA signal, is transmitted is connected to a pin whose pin number is 15. The DDC 83 is connected to the line on which the SDA signal is transmitted and the line on which the SCL signal is transmitted.

The HPD line 86 which is used by the source device to detect connection of the sync device, as described above, is connected to a pin whose pin number is 19. The power line 87 which supplies power, as described above, is connected to a pin whose pin number is 18.

[Outline of SPDIF Standard]

Figure 6:
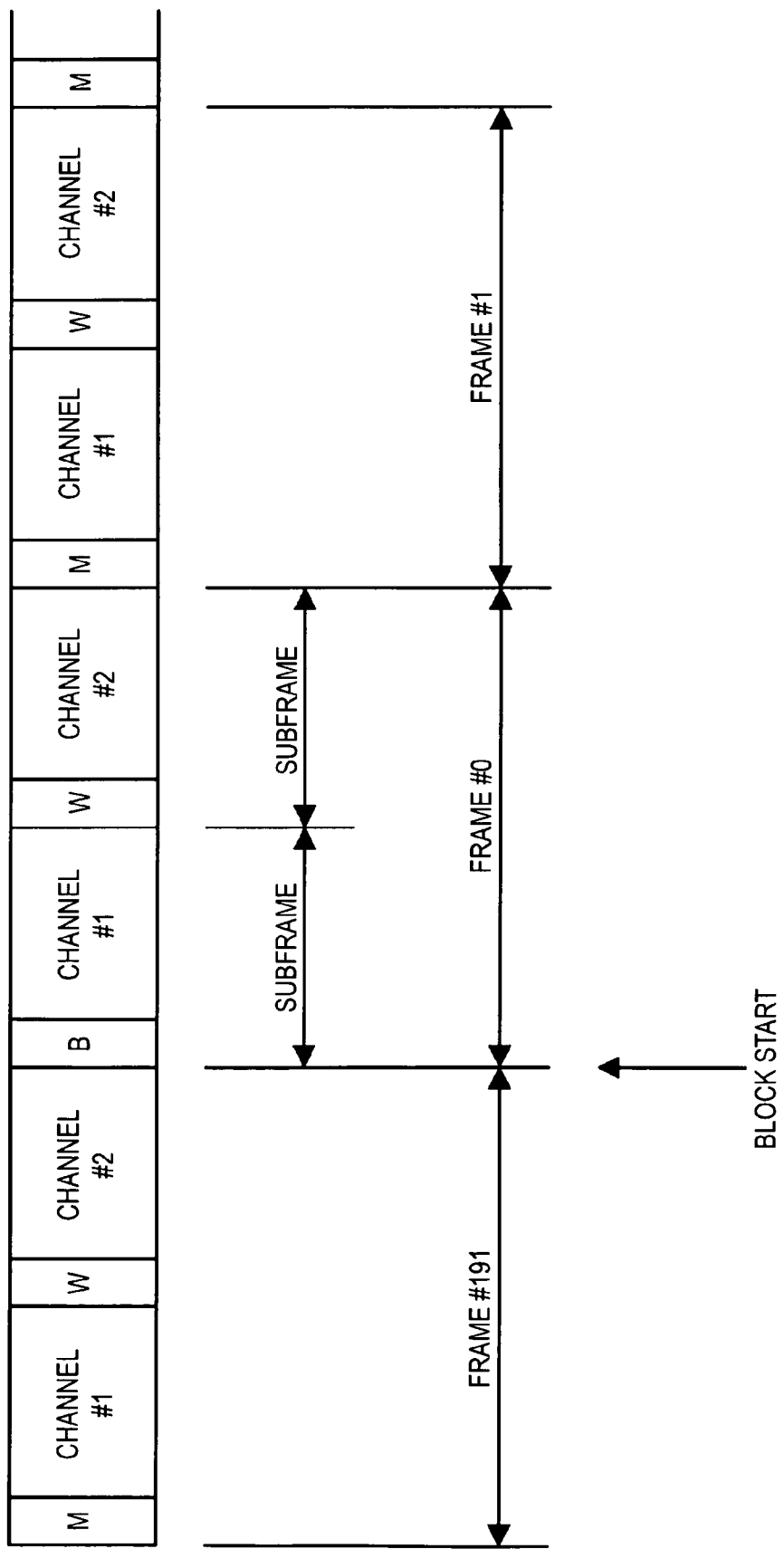
FIG. 6 is a diagram showing a frame configuration based on the SPDIF standard.

Next, the summary of the SPDIF standard will be described. FIG. 6 is a diagram showing a frame configuration based on the SPDIF standard. According to the SPDIF standard, each frame includes two subframes. In the case of two-channel stereo sound, a left channel signal is included in the first subframe, and a right channel signal is included in the second subframe.

As described above, a preamble is provided at the head of the subframe. In the case of the left channel signal, "M" is given as a preamble, and in the case of the right channel signal, "W" is given as a preamble. To the head preamble for every 192 frames, "B" is given in order to indicate block start. That is, one block includes 192 frames. A block is a unit which constitutes a channel status described below.

Figure 7:
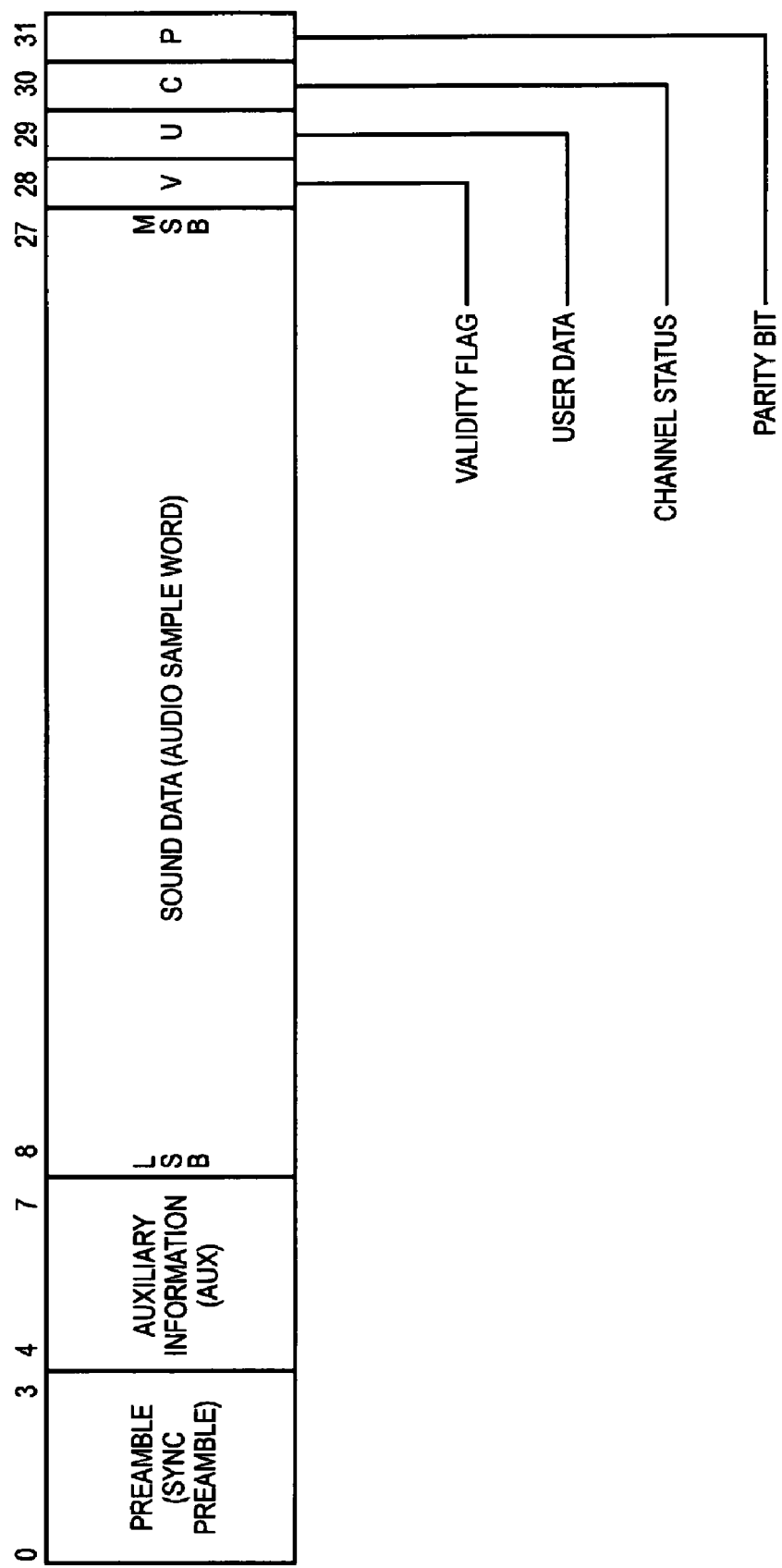
FIG. 7 is a diagram showing a subframe configuration based on the SPDIF standard.

FIG. 7 is a diagram showing a subframe configuration based on the SPDIF standard. A subframe includes 0th to 31st time slots, that is, 32 time slots in total. The 0th to third time slots indicate a preamble (Sync preamble). As described above, the preamble is written "M", "W", or "B" in order to discriminate the left and right channels or to indicate the start position of a block.

The fourth to 27th time slots are a main data field, and when a 24-bit code range is used, the entire time slots represent sound data. When a 20-bit code range is used, the eighth to 27-th time slots represent sound data (Audio sample word). In the latter case, the fourth to seventh time slots may be used as auxiliary information (Auxiliary sample bits).

The 28th time slot is a validity flag of the main data field. The 29th time slot is one bit of user data. A series of user data can be constituted by accumulating the 29th time slots in the respective frames. Messages of user data are formed in 8-bit information units (IU), and one message includes 3 to 129 information units.

"0" of 0 to 8 bits may be present between the information units. The head of the information unit is identified by a start bit "1". First to seventh information units in a message are reserved, and the user can set arbitrary information in the eighth information unit and later. The messages are divided by "0" of 8 or more bits.

The 30th time slot represents one bit of a channel status. A series of channel status can be constituted by accumulating the 30th time slots in the respective frames for each block. The head position of the block is indicated by the preamble (the 0th to third time slots), as described above.

The 31st time slot is a parity bit. This parity bit is given such that the numbers of "0" and "1" in the fourth to 31st time slots are even numbers.

Figure 8:
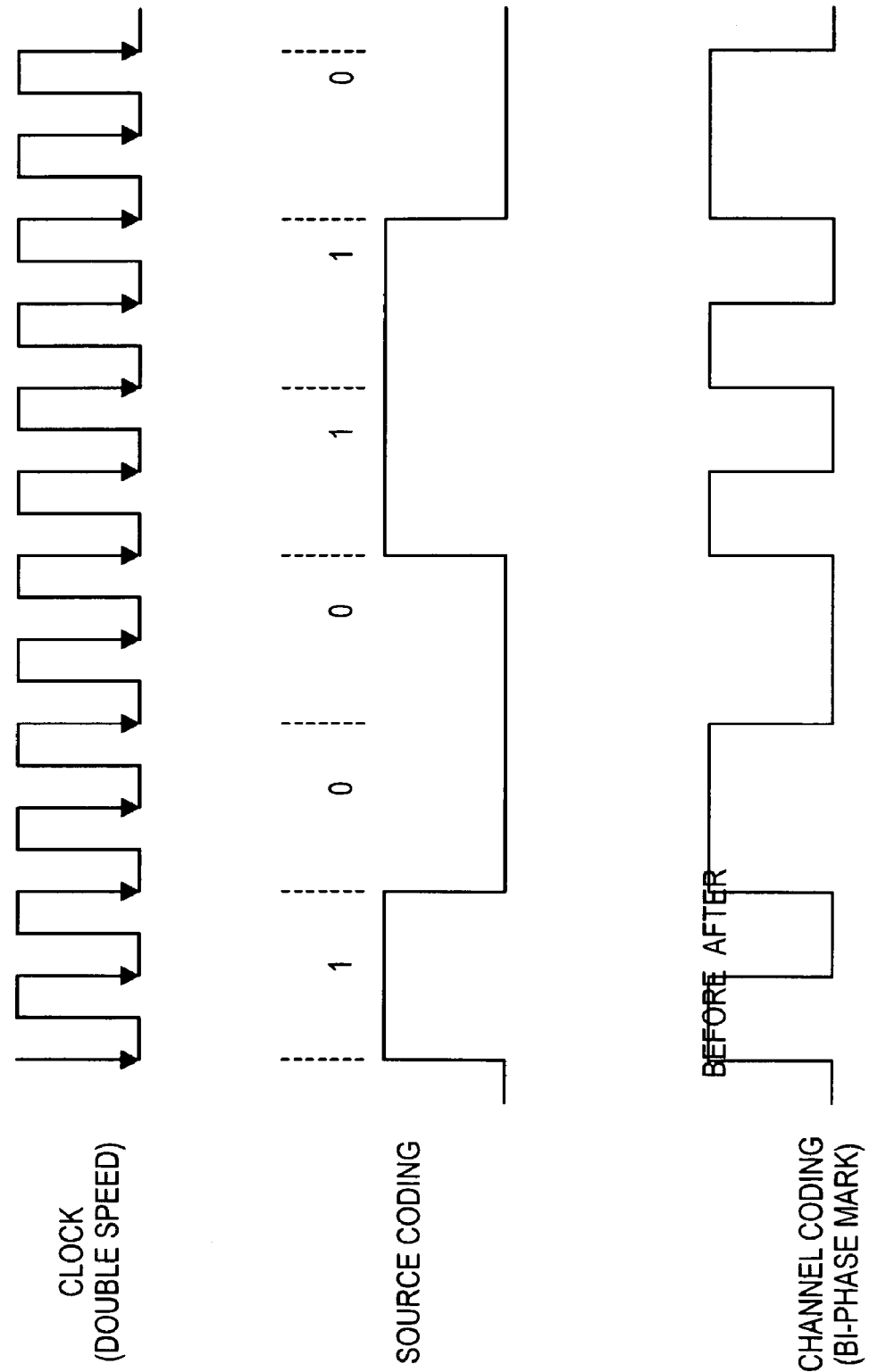
FIG. 8 is a diagram showing a signal modulation method based on the SPDIF standard.

FIG. 8 is a diagram showing a signal modulation method based on the SPDIF standard. According to the SPDIF standard, the fourth to 31st time slots of a subframe excluding the preamble are bi-phase mark modulated. At the time of bi-phase mark modulation, a clock two times faster than an original signal (source coding). If the clock cycle of the original signal is divided into a first half and a second half, the output of bi-phase mark modulation is typically inverted at an edge of the first half clock cycle. At an edge of the second half clock cycle, when the original signal is "1", the output of bi-phase mark modulation is inverted, and when the original signal is "0", the output of bi-phase mark modulation is not inverted. Accordingly, a clock component in the original signal can be extracted from the bi-phase mark modulated signal.

FIG. 9 is a diagram showing preamble channel coding based on the SPDIF standard. As described above, the fourth to 31st time slots of a subframe are bi-phase mark modulated. The preamble of the 0th to third time slots is treated as a bit pattern synchronized with the double speed clock, not typical bi-phase mark modulation. That is, two bits are assigned to each time slot of the 0th to third time slots, so an 8-bit pattern shown in the drawing is obtained.

If a previous state is "0", "11101000" is assigned to the preamble "B", "11100010" is assigned to "M", and "1100100" is assigned to "W". If a previous state is "1", "00010111" is assigned to "B", "00011101" is assigned to "M", and "00011011" is assigned to "W".

FIG. 10 is a diagram showing the format of a channel status based on the SPDIF standard. The channel status is obtained by accumulating the 30th time slots in the respective subframes for each block, and retains information regarding audio channels transmitted by the same subframe. In FIG. 10, the contents of the channel status are placed byte by byte in a vertical direction, and the bit configuration in each byte is shown in a horizontal direction. Note that a description will be made assuming that a consumer-use format is adopted.

In the 0th byte, the 0th bit is a bit which indicates that a channel status is for a consumer use. The first bit is a bit which indicates whether or not it is a sample of linear PCM. The second bit is a bit which indicates whether or not it is copyrighted software. The third to fifth bits constitute a field which includes presence/absence of pre-emphasis as additional format information. The sixth and seventh bits constitute a field which indicates a mode.

The first byte is a field which indicates a category code. The category code represents the model of a device which generates an audio signal. The category code is placed in the eighth to 15th bits from the head of the channel status.

In the second byte, the 0th to third bits constitute a field which indicates a source number. The source number is a number which identifies a source, and is in a range of "1" to "15". The fourth to seventh bits constitute a field which indicates a channel number. The channel number is a number which identifies a right channel or a left channel.

In the third byte, the 0th to third bits constitute a field which indicates a sampling frequency. With regard to the sampling frequency, for example, "0000" represents 44.1 KHz. The fourth and fifth bits constitute a field which indicates clock accuracy. The clock accuracy includes three levels of accuracy.

In the fourth byte, the 0th to third bits constitute a field which indicates a word length. This means that if the 0th bit is "0", the maximum sample length is 20 bits, and if the 0th bit is "1", the maximum sample length is 24 bits. With regard to the first to third bits, a specific number of bits can be specified. The fourth and fifth bits constitute a field which indicates an original sampling frequency.

The current SPDIF standard does not define the fifth byte and later. For example, the second bit of the fifth byte may be used as an encryption bit which indicates whether or not an audio data is encrypted. That is, in the channel status of signals from the sync device 120, when the second bit of the fifth byte is "1", it means that audio data from the sync device 120 is encrypted. In the channel status of signals from the sync device 120, when the second bit of the fifth byte is "0", it means that audio data from the sync device 120 is not encrypted.

FIGS. 11A to 11D are diagrams showing the format of user data based on the SPDIF standard. User data is obtained by accumulating the 29th time slots in the respective subframes for each block. As described above, messages of user data are formed in 8-bit information units (IU), and one message includes 3 to 129 information units. The messages are divided by "0" of 8 or more bits, and the head of the information unit is identified by the start bit "1".

As shown in FIG. 11A, the head information unit includes a mode field and an item field. The mode field is a field which indicates the class of a message and includes, for example, preset information or the like. The item field is a field which further defines the type of message. As shown in FIG. 11B, the second information unit includes the number of information units. The number of information units ranging from "1" to "127" can be represented by 7 bits excluding the head bit.

As shown in FIG. 11C, the third information unit includes a category code. The category code is a category code in the generation source of audio data which is represented by the first byte of the channel status in FIG. 10. In the case of user data, the head bit of the information unit is the start bit, so data of 7 bits is effective. The 7 bits correspond to the eighth to 14th bits in the channel status. The 15th bit, that is, an L bit is a bit which indicates commercial pre-recording software, so it is not included in the messages of user data.

As shown in FIG. 11D, the fourth to seventh information units include three kinds of user information X, Y, and Z. One byte (8 bits) is assigned to each of the three kinds of user information.

[Configuration Example of Source-Side Transmitting/Receiving Circuit, Sync-Side Transmitting/Receiving Circuit, and the Like]

Figure 12:
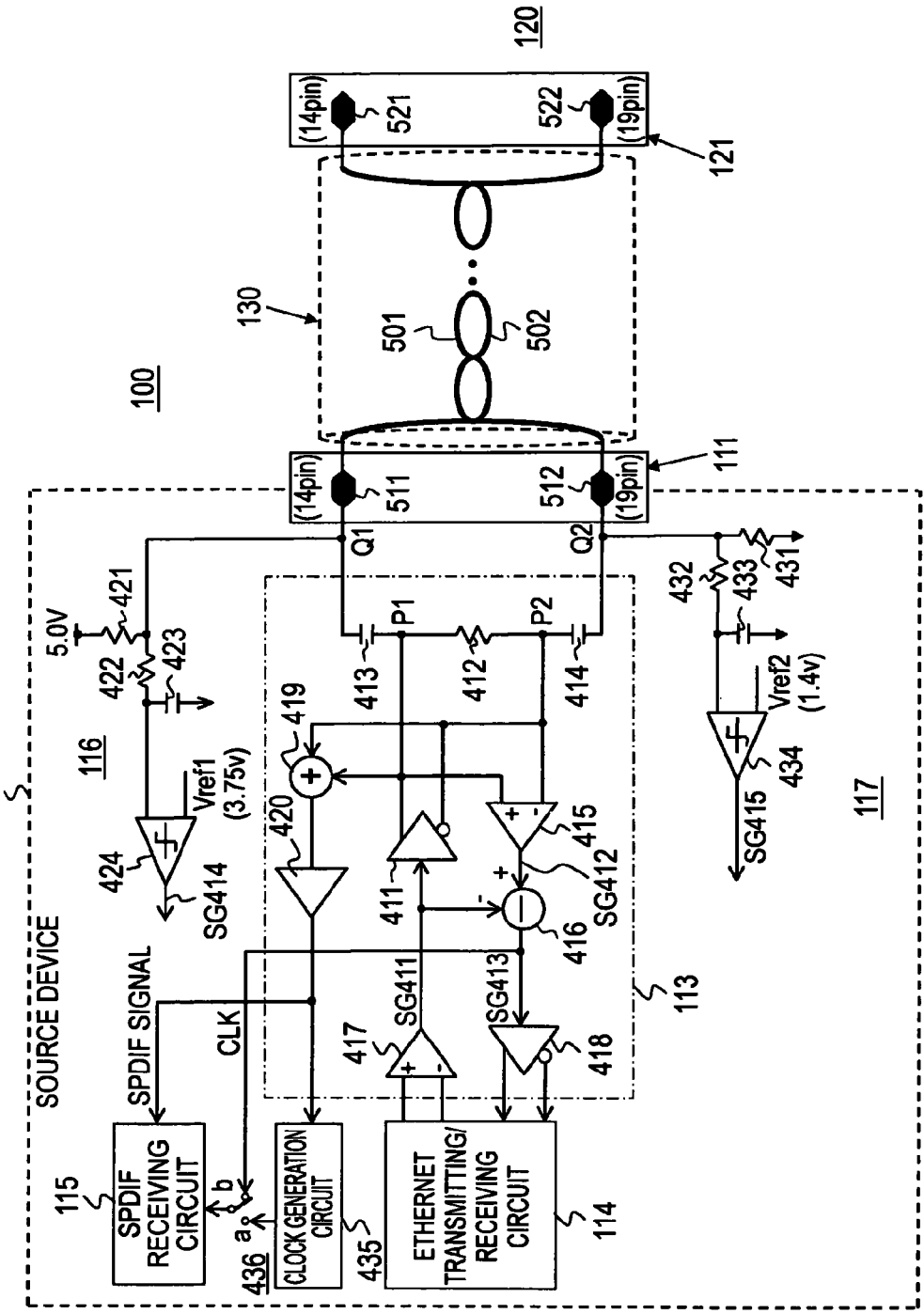
FIG. 12 is a connection diagram showing a configuration example of a source-side transmitting/receiving circuit, a sync device model detection circuit, a plug connection detection circuit, and the like in a source device according to the first embodiment.

FIG. 12 shows a configuration example of the source-side transmitting/receiving circuit 113, the sync device model detection circuit 116, the plug connection detection circuit 117, and the like of the source device 110. The Ethernet transmitting/receiving circuit 114 performs LAN (Local Area Network) communication, that is, transmission/reception of the Ethernet signal by using a transmission path including a pair of lines from among a plurality of lines constituting the HDMI cable 130. In this embodiment, a pair of lines includes a reserve line corresponding to the reserve pin (14th pin) and an HPD line corresponding to the HPD pin (19th pin).

The SPDIF receiving circuit 115 receives the SPDIF signal by using the above-described transmission path including a pair of lines. When a clock signal synchronized with the SPDIF signal is transmitted by using a transmission path including a pair of lines, the SPDIF receiving circuit 115 can use the clock signal.

The source device 110 has a LAN signal transmitting circuit 411, a terminating resistor 412, AC coupling capacitors 413 and 414, a LAN signal receiving circuit 415, a subtraction circuit 416, amplifiers 417 and 418, an addition circuit 419, and an amplifier 420. These form the source-side transmitting/receiving circuit 113. The source device 110 has a pull-up resistor 421, a resistor 422, a capacitor 423, and a comparator 424, which form the sync device model detection circuit 116. Note that the resistor 422 and the capacitor 423 form a low pass filter.

The source device 110 has a pull-down resistor 431, a resistor 432, a capacitor 433, and a comparator 434, which form the plug connection detection circuit 117. Note that the resistor 432 and the capacitor 433 form a low pass filter. The source device 110 has a clock generation circuit 435 and a switch 436.

A series circuit of the pull-up resistor 421, the AC coupling capacitor 413, the terminating resistor 412, the AC coupling capacitor 414, and the pull-down resistor 431 is connected between a power line (+5.0 V) and a ground line. A node P1 of the AC coupling capacitor 413 and the terminating resistor 412 is connected to the positive output side of the LAN signal transmitting circuit 411 and also to the positive input side of the LAN signal receiving circuit 415. A node P2 of the AC coupling capacitor 414 and the terminating resistor 412 is connected to the negative output side of the LAN signal transmitting circuit 411 and also to the negative input side of the LAN signal receiving circuit 415. A transmission signal (transmission data) SG411 is supplied from the Ethernet transmitting/receiving circuit 114 to the input side of the LAN signal transmitting circuit 411 through the differential input amplifier 417.

An output signal SG412 of the LAN signal receiving circuit 415 is supplied to the positive-side terminal of the subtraction circuit 416, and the transmission signal (transmission data) SG411 is supplied to the negative-side terminal of the subtraction circuit 416. In the subtraction circuit 416, the transmission signal SG411 is subtracted from the output signal SG412 of the LAN signal receiving circuit 415 to obtain a received signal SG413.

The received signal SG413 is supplied to the Ethernet transmitting/receiving circuit 114 through the amplifier 418 as differential output and to the fixed terminal b of the switch 436. When the LAN signal (Ethernet signal) is transmitted as a differential signal through the reserve line and the HPD line, the received signal SG413 becomes the LAN signal. When the clock signal is transmitted as a differential signal through the reserve line and the HPD line, the received signal SG413 becomes the clock signal.

A node Q1 of the pull-up resistor 421 and the AC coupling capacitor 413 is connected to the ground line through a series circuit of the resistor 422 and the capacitor 423. An output signal of the low pass filter obtained at the node of the resistor 422 and the capacitor 423 is supplied to one input terminal of the comparator 424. The comparator 424 compares the output signal of the low pass filter with a reference voltage Vref1 (+3.75 V) which is supplied to the other input terminal of the comparator 424. An output signal SG414 of the comparator 424 is supplied to a control section (CPU) (not shown) of the source device 110.

A node Q2 of the AC coupling capacitor 414 and the pull-down resistor 431 is connected to the ground line through a series circuit of the resistor 432 and the capacitor 433. An output signal of the low pass filter obtained at the node of the resistor 432 and the capacitor 433 is supplied to one input terminal of the comparator 434. The comparator 434 compares the output signal of the low pass filter with a reference voltage Vref2 (+1.4 V) which is supplied to the other input terminal of the comparator 434. An output signal SG415 of the comparator 434 is supplied to the control section (CPU) (not shown) of the source device 110.

The node P1 of the AC coupling capacitor 413 and the terminating resistor 412 is connected to one input terminal of the addition circuit 419. The node P2 of the AC coupling capacitor 414 and the terminating resistor 412 is connected to the other input terminal of the addition circuit 419. An output signal of the addition circuit 419 is supplied to the SPDIF receiving circuit 115 through the amplifier 420 and also to the clock generation circuit 435. When the SPDIF signal is transmitted as an in-phase signal through the reserve line and the HPD line, the output signal of the addition circuit 419 becomes the SPDIF signal.

The clock generation circuit 435 has a PLL circuit, and when the SPDIF signal is supplied, generates a clock signal synchronized with the SPDIF signal with the SPDIF signal as a reference signal. The clock signal generated by the clock generation circuit 435 is supplied to the fixed terminal a of the switch 436. A clock signal which is obtained in the movable terminal of the switch 436 is supplied to the SPDIF receiving circuit 115 as an operation clock.

The switch 436 is switched under the control of the control section (CPU) (not shown). When the clock signal transmitted from the sync device 120 is used, the switch 436 is switched to the terminal b. When the clock signal generated by the clock generation circuit 435 is used, the switch 436 is switched to the terminal a.

Figure 13:
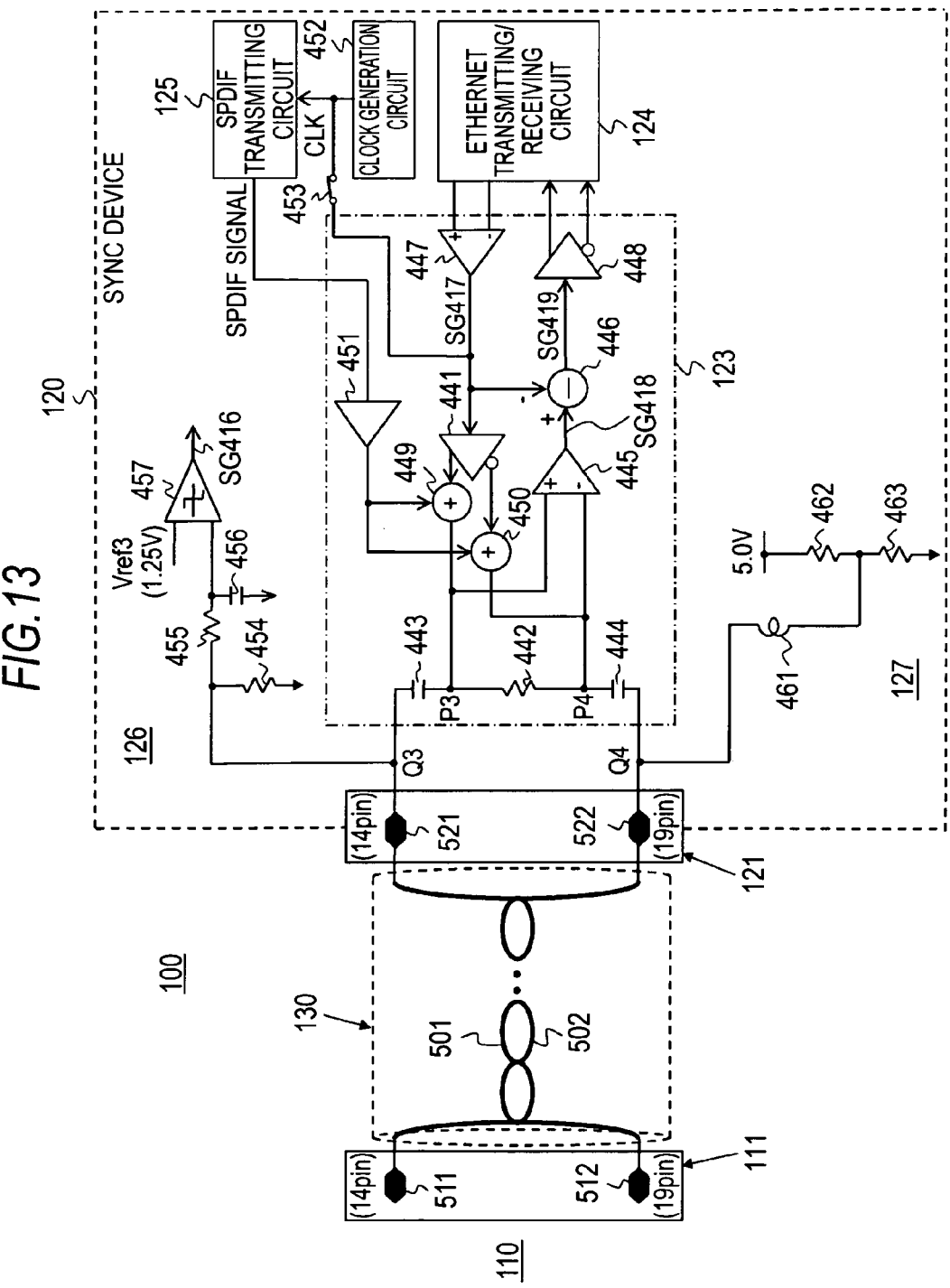
FIG. 13 is a connection diagram showing a configuration example of a source-side transmitting/receiving circuit, a sync device model detection circuit, a plug connection detection circuit, and the like in a sync device according to the first embodiment.

FIG. 13 shows a configuration example of the sync-side transmitting/receiving circuit 123, the source device model detection circuit 126, the plug connection transfer circuit 127, and the like of the sync device 120. The Ethernet transmitting/receiving circuit 124 performs LAN (Local Area Network) communication, that is, transmission/reception of the Ethernet signal by using a transmission path including a pair of lines from among a plurality of lines constituting the HDMI cable 130. In this embodiment, as described above, a pair of lines includes the reserve line corresponding to the reserve pin (14th pin) and the HPD line corresponding to the HPD pin (19th pin).

The SPDIF transmitting circuit 125 transmits the SPDIF signal by using the above-described transmission path including a pair of lines. The clock signal which is generated by a clock generation circuit 452 and synchronized with the SPDIF signal can be transmitted by using the above-described transmission path including a pair of lines.

The sync device 120 has a LAN signal transmitting circuit 441, a terminating resistor 442, AC coupling capacitors 443 and 444, a LAN signal receiving circuit 445, a subtraction circuit 446, amplifiers 447 and 448, addition circuits 449 and 450, and an amplifier 451. These form the sync-side transmitting/receiving circuit 123. The sync device 120 has a pull-down resistor 454, a resistor 455, a capacitor 456, and a comparator 457, which form the source device model detection circuit 126. Note that the resistor 455 and the capacitor 456 form a low pass filter.

The sync device 120 has a choke coil 461, a resistor 462, and a resistor 463, which form the plug connection transfer circuit 127. The sync device 120 has a clock generation circuit 452 and a connection switch 453.

A series circuit of the resistor 462 and the resistor 463 is connected between the power line (+5.0 V) and the ground line. A series circuit of the choke coil 461, the AC coupling capacitor 444, the terminating resistor 442, the AC coupling capacitor 443, and the pull-down resistor 454 is connected between the node of the resistor 462 and the resistor 463 and the ground line.

A node P3 of the AC coupling capacitor 443 and the terminating resistor 442 is connected to the output side of the addition circuit 449 and also to the positive input side of the LAN signal receiving circuit 445. A node P4 of the AC coupling capacitor 444 and the terminating resistor 442 is connected to the output side of the addition circuit 450 and also to the negative input side of the LAN signal receiving circuit 445.

One input side of the addition circuit 449 is connected to the positive output side of the LAN signal transmitting circuit 441, and the SPDIF signal output from the SPDIF transmitting circuit 125 is supplied to the other input side of the addition circuit 449 through the amplifier 451. One input side of the addition circuit 450 is connected to the negative output side of the LAN signal transmitting circuit 441, and the SPDIF signal output from the SPDIF transmitting circuit 125 is supplied to the other input side of the addition circuit 450 through the amplifier 451.

A transmission signal (transmission data) SG417 is supplied from the Ethernet transmitting/receiving circuit 124 to the input side of the LAN signal transmitting circuit 441 through the differential input amplifier 447. An output signal SG418 of the LAN signal receiving circuit 445 is supplied to the positive-side terminal of the subtraction circuit 446, and the transmission signal SG417 is supplied to the negative-side terminal of the subtraction circuit 446. In the subtraction circuit 446, the transmission signal SG417 is subtracted from the output signal SG418 of the LAN signal receiving circuit 445 to obtain a received signal (received data) SG419. When the LAN signal (Ethernet signal) is transmitted as a differential signal through the reserve line and the HPD line, the received signal SG419 becomes the LAN signal. The received signal SG419 is supplied as differential output to the Ethernet transmitting/receiving circuit 124 through the amplifier 448.

A node Q3 of the pull-down resistor 454 and the AC coupling capacitor 443 is connected to the ground line through a series circuit of the resistor 455 and the capacitor 456. An output signal of the low pass filter obtained at the node of the resistor 455 and the capacitor 456 is supplied to one input terminal of the comparator 457. The comparator 457 compares the output signal of the low pass filter with a reference voltage Vref3 (+1.25 V) which is supplied to the other input terminal of the comparator 457. An output signal SG416 of the comparator 457 is supplied to a control section (CPU) (not shown) of the sync device 120.

The clock signal output from the clock generation circuit 452 is supplied to the SPDIF transmitting circuit 125 as an operation clock. For this reason, the SPDIF signal output from the SPDIF transmitting circuit 125 is synchronized with the clock signal output from the clock generation circuit 452. The clock signal output from the clock generation circuit 452 is supplied to the input side of the LAN signal transmitting circuit 441 through the connection switch 453. The connection switch 453 is connected/disconnected under the control of the control section (CPU) (not shown). When the clock signal is transmitted to the source device 110, the connection switch 453 is put in a connection state. When the clock signal is not transmitted to the source device 110, the connection switch 453 is put in a non-connection state.

As shown in FIGS. 12 and 13, the reserve line 501 and the HPD line 502 included in the HDMI cable 130 form a twisted pair. A source-side end 511 of the reserve line 501 is connected to the 14th pin of the HDMI terminal 111 of the source device 110, and a sync-side end 521 of the reserve line 501 is connected to the 14th pin of the HDMI terminal 121 of the sync device 120. A source-side end 512 of the HPD line 502 is connected to the 19th pin of the HDMI terminal 111 of the source device 110, and a sync-side end 522 of the HPD line 502 is connected to the 19th pin of the HDMI terminal 121 of the sync device 120.

In the source device 110, the node Q1 of the pull-up resistor 421 and the AC coupling capacitor 413 is connected to the 14th pin of the HDMI terminal 111. In the source device 110, the node Q2 of the pull-down resistor 431 and the AC coupling capacitor 414 is connected to the 19th pin of the HDMI terminal 111.

In the sync device 120, the node Q3 of the pull-down resistor 454 and the AC coupling capacitor 443 is connected to the 14th pin of the HDMI terminal 121. In the sync device 120, a node Q4 of the choke coil 461 of the AC coupling capacitor 444 is connected to the 19th pin of the HDMI terminal 121.

[LAN Communication Operation]

The operation of LAN communication in the configuration shown in FIGS. 12 and 13 will be described. In the source device 110, the transmission signal (transmission data) SG411 is supplied from the Ethernet transmitting/receiving circuit 114 to the input side of the LAN signal transmitting circuit 411 through the amplifier 417. A differential signal (a positive output signal or a negative output signal) corresponding to the transmission signal SG411 is output from the LAN signal transmitting circuit 411. This differential signal is supplied to the nodes P1 and P2 and transmitted to the sync device 120 through a pair of lines (the reserve line 501 and the HPD line 502) of the HDMI cable 130.

In the sync device 120, the transmission signal (transmission data) SG417 is supplied from the Ethernet transmitting/receiving circuit 124 to the input side of the LAN signal transmitting circuit 441 through the amplifier 447. A differential signal (a positive output signal or a negative output signal) corresponding to the transmission signal SG417 is output from the LAN signal transmitting circuit 441. This differential signal is supplied to the nodes P3 and P4 and transmitted to the source device 110 through a pair of lines (the reserve line 501 and the HPD line 502) of the HDMI cable 130.

In the source device 110, the input side of the LAN signal receiving circuit 415 is connected to the nodes P1 and P2. Thus, an added signal of a transmission signal corresponding to a differential signal (current signal) output from the LAN signal transmitting circuit 411 and a received signal corresponding to a differential signal transmitted from the sync device 120 as described above is obtained as the output signal SG412 of the LAN signal receiving circuit 415. In the subtraction circuit 416, the transmission signal SG411 is subtracted from the output signal SG412 of the LAN signal receiving circuit 415. For this reason, the output signal SG413 of the subtraction circuit 416 corresponds to the transmission signal (transmission data) SG417 of the sync device 120. The output signal SG413 is supplied to the Ethernet transmitting/receiving circuit 114 through the amplifier 418.

In the sync device 120, the input side of the LAN signal receiving circuit 445 is connected to the nodes P3 and P4. Thus, a transmission signal corresponding to a differential signal (current signal) output from the LAN signal transmitting circuit 441 and a received signal corresponding to a differential signal transmitted from the source device 110 as described above is obtained as the output signal SG418 of the LAN signal receiving circuit 445. In the subtraction circuit 446, the transmission signal SG417 is subtracted from the output signal SG418 of the LAN signal receiving circuit 445. For this reason, the output signal SG419 of the subtraction circuit 446 corresponds to the transmission signal (transmission data) SG411 of the source device 110. The output signal SG419 is supplied to the Ethernet transmitting/receiving circuit 124 through the amplifier 448.

As described above, bi-directional communication of the LAN signal (Ethernet signal) can be performed between the Ethernet transmitting/receiving circuit 114 of the source device 110 and the Ethernet transmitting/receiving circuit 124 of the sync device 120.

[Transmission Operation of SPDIF Signal]

The transmission operation of the SPDIF signal in the configuration of FIGS. 12 and 13 will be described. In the sync device 120, the SPDIF signal output from the SPDIF transmitting circuit 125 is supplied to the nodes P3 and P4 through the amplifier 451 and the addition circuits 449 and 450. When this happens, the SPDIF signal is transmitted as an in-phase signal to the source device 110 through a pair of lines (the reserve line 501 and the HPD line 502) of the HDMI cable 130.

In the source device 110, the nodes P1 and P2 are connected to the input sides of the addition circuit 419. Thus, the SPDIF signal corresponding to the in-phase signal transmitted from the sync device 120 is obtained as the output signal of the addition circuit 419. The SPDIF signal is supplied to the SPDIF receiving circuit 115.

[Clock Signal]

The SPDIF receiving circuit 115 performs data extraction, decoding, and the like on the SPDIF signal on the basis of the clock signal corresponding to the SPDIF signal to acquire audio data. In the SPDIF receiving circuit 115, either the clock signal generated by the clock generation circuit 435 of the source device 110 or the clock signal CLK transmitted from the sync device 120 is used.

The state where the clock signal generated by the clock generation circuit 435 is used will be described. In this case, in the sync device 120, the connection switch 453 is put in the non-connection state, and the clock signal CLK generated by the clock generation circuit 452 is not transmitted to the source device 110. In this case, in the source device 110, the switch 436 is connected to the terminal a. When this happens, the clock signal generated by the clock generation circuit 435 is supplied to the SPDIF receiving circuit 115.

The clock signal of the clock generation circuit 435 is deemed to be generated by the PLL circuit with the SPDIF signal as a reference signal and synchronized with the SPDIF signal. Therefore, the SPDIF receiving circuit 115 performs data extraction, decoding, and the like on the SPDIF signal on the basis of the clock signal CLK synchronized with the SPDIF signal to acquire data, such as audio data or the like.

Next, the state where the clock signal CLK transmitted from the sync device 120 is used will be described. In the sync device 120, the connection switch 453 is put in the connection state. The clock signal CLK generated by the clock generation circuit 452 is supplied to the input side of the LAN signal transmitting circuit 441. A differential signal (a positive output signal or a negative output signal) corresponding to the clock signal CLK is output from the LAN signal transmitting circuit 441. The differential signal is supplied to the nodes P3 and P4 and transmitted to the source device 110 through a pair of lines (the reserve line 501 and the HPD line 502) of the HDMI cable 130.

In the source device 110, the switch 436 is connected to the terminal b. In the source device 110, the input side of the LAN signal receiving circuit 415 is connected to the nodes P1 and P2. For this reason, the output signal SG412 of the LAN signal receiving circuit 415, and accordingly, the output signal SG413 of the subtraction circuit 416 becomes the clock signal CLK transmitted from the sync device 120. The clock signal CLK is supplied to the SPDIF receiving circuit 115 through the switch 436.

The SPDIF signal which is supplied to the SPDIF receiving circuit 115 is obtained by the SPDIF transmitting circuit 125 of the sync device 120 with the clock signal CLK generated by the clock generation circuit 452 as an operation clock. For this reason, in the source device 110, the clock signal CLK which is transmitted from the sync device 120 and supplied to the SPDIF receiving circuit 115 is synchronized with a received SPDIF signal which is supplied to the SPDIF receiving circuit 115. Therefore, the SPDIF receiving circuit 115 performs data extraction, decoding, and the like on the SPDIF signal on the basis of the clock signal CLK synchronized with the SPDIF signal to acquire data, such as audio data or the like.

[Device Model Detection and Plug Connection Detection]

Referring to FIGS. 12 and 13, in addition to the above-described LAN communication, the HPD line 502 is used to notify the source device 110 by a DC bias level that the HDMI cable 130 is connected to the sync device 120. That is, when the HDMI cable 130 is connected to the sync device 120, the resistors 462 and 463 and the choke coil 461 of the sync device 120 bias the HPD line 502 to about 4 V through the 19th pin of the HDMI terminal 121. The source device 110 extracts the DC bias of the HPD line 502 by the low pass filter including the resistor 432 and the capacitor 433, and compares the extracted DC bias with the reference voltage Vref2 (for example, 1.4 V) by the comparator 434.

If the HDMI cable 130 is not connected to the sync device 120, the voltage of the 19th pin of the HDMI terminal 111 of the source device 110 is smaller than the reference voltage Vref2 due to presence of the pull-down resistor 431. Meanwhile, if the HDMI cable 130 is connected to the sync device 120, the voltage of the 19th pin of the HDMI terminal 111 is larger than the reference voltage Vref2. Therefore, when the HDMI cable 130 is connected to the sync device 120, the output signal SG415 of the comparator 434 becomes high level. Otherwise, the output signal SG415 of the comparator 434 becomes low level. As a result, the control section (CPU) (not shown) of the source device 120 can recognize whether the HDMI cable 130 is connected to the sync device 120 or not on the basis of the output signal SG415 of the comparator 434.

Referring to FIGS. 12 and 13, the DC bias potential of the reserve line 501 ensures being able to recognize whether the devices connected to both ends of the HDMI cable 130 are eHDMI-compatible devices or eHDMI-incompatible devices.

As described above, the source device 110 pulls up (+5 V) the reserve line 501 by the resistor 421, and the sync device 120 pulls down the reserve line 501 by the resistor 454. The resistors 421 and 454 are not present in an eHDMI-incompatible device.

As described above, the source device 110 compares the DC potential of the reserve line 501 after passing through the low pass filter including the resistor 422 and the capacitor 423 with the reference voltage Vref1 by the comparator 424. When the sync device 120 is an eHDMI-compatible device and the pull-down resistor 454 is present, the voltage of the reserve line 501 becomes 2.5 V. Meanwhile, when the sync device 120 is an eHDMI-incompatible device and the pull-down resistor 454 is not present, the voltage of the reserve line 501 becomes 5 V due to presence of the pull-up resistor 421.

For this reason, when the reference voltage Vref1 becomes, for example, 3.75 V, the output signal SG414 of the comparator 424 is at the low level when the sync device 120 is an eHDMI-compatible device, and otherwise, is at the high level. Therefore, the control section (CPU) (not shown) of the source device 110 can recognize whether the sync device 120 is an eHDMI-compatible device or not on the basis of the output signal SG414 of the comparator 424.

Similarly, as described above, the sync device 120 compares the DC potential of the reserve line 501 after passing through the low pass filter including the resistor 455 and the capacitor 456 with the reference voltage Vref3 by the comparator 457. When the source device 110 is an eHDMI-compatible device and the pull-up resistor 421 is present, the voltage of the reserve line 501 becomes 2.5 V. Meanwhile, when the source device 110 is an eHDMI-incompatible device and the pull-up resistor 421 is not present, the voltage of the reserve line 501 becomes 0 V due to presence of the pull-down resistor 454.

For this reason, when the reference voltage Vref3 becomes, for example, 1.25 V, the output signal SG416 of the comparator 457 is at the high level when the source device 110 is an eHDMI-compatible device, and otherwise, is at the low level. Therefore, the control section (CPU) (not shown) of the sync device 120 can recognize whether the source device 110 is an eHDMI-compatible device or not on the basis of the output signal SG416 of the comparator 457.

The pull-up resistor 421 shown in FIG. 12 may be provided inside the HDMI cable 130, not inside the source device 110. In such a case, the terminals of the pull-up resistor 421 are individually connected to the reserve line 501 and a line connected to the power supply (power supply potential) from among the lines provided in the HDMI cable 130.

The pull-down resistor 454 and the resistor 463 shown in FIG. 13 may be provided inside the HDMI cable 130, not inside the sync device 120. In such a case, the terminals of the pull-down resistor 454 are individually connected to the reserve line 501 and a line connected to the ground (reference potential) from among the lines provided in the HDMI cable 130. The terminals of the resistor 463 are individually connected to the HPD line 502 and a line connected to the ground (reference potential) from among the lines provided in the HDMI cable 130.

As described above, the sync device 120 is configured to send the clock signal as a differential signal to the source device 110 through the transmission path including the reserve line and the HPD line. Meanwhile, the source device 110 is configured to extract and use the clock signal transmitted as a differential signal from the sync device 120 through the transmission path including the reserve line and the HPD line.

As described above, in the source device 110, the state where the clock signal is transmitted from the sync device 120 and used, or the state where the clock signal generated by the clock generation circuit 435 is used is set in advance. This setting is performed by the exchange of CDC messages regarding the clock signal between the source device 110 and the sync device 120, as described above. For example, when the sync device 120 supports clock signal transmission, and the source device 110 supports clock signal reception, a state where a clock signal is transmitted from the sync device 120 to the source device 110 is set.

The clock signal from the sync device 120 to the source device 110 is transmitted as a differential signal through the transmission path including the reserve line and the HPD line. As described above, the LAN signal (Ethernet signal) between the source device 110 and the sync device 120 is also transmitted as a differential signal through the transmission path including the reserve line and the HPD line. For this reason, the clock signal from the sync device 120 to the source device 110 is not transmitted when communication of the LAN signal (Ethernet signal) between the source device 110 and the sync device 120 is performed. Therefore, the clock signal will have no influence on the communication of the LAN signal (Ethernet signal).

FIG. 14 shows the operation using the reserve line and the HPD line in the above-described embodiment as a whole. A 14th pin corresponds to the reserve line 501, and a 19th pine corresponds to the HPD line 502. When neither an Ethernet signal nor a SPDIF signal is transmitted, the operation based on the known HDMI standard is carried out. When an Ethernet signal is transmitted, the positive-polarity signal of the Ethernet signal is superimposed on the 14th pin, and the negative-polarity signal of the Ethernet signal is superimposed on the 19th pin.

When an SPDIF signal is transmitted, the positive-polarity signal of the SPDIF signal is superimposed on the 14th pin and the 19th pin. In this case, the clock signal CLK synchronized with the SPDIF signal can be transmitted. When the clock signal CLK is transmitted, the positive-polarity signal of the clock signal CLK is superimposed on the 14th pin, and the negative-polarity signal of the clock signal CLK is superimposed on the 19th pin.

When both of an Ethernet signal and a SPDIF signal are transmitted, the positive-polarity signal of the Ethernet signal and the positive-polarity signal of the SPDIF signal are superimposed on the 14th pin, and the negative-polarity signal of the Ethernet signal and the positive-polarity signal of the SPDIF signal are superimposed on the 19th pin. In this case, there is an influence on the transmission of the Ethernet signal, so the clock signal CLK synchronized with the SPDIF signal may not be transmitted.

[Transmission/Reception of Function Information]

In the above-described AV system 100, the source device 110 and the sync device 120 mutually acquire function information, and transmission of the LAN signal (Ethernet signal), transmission of the SPDIF signal, and the like are selectively performed on the basis of the function information.

Transmission/reception of function information using a CEC line (CEC channel) will be described. In the CEC line, control data can be transmitted between the source device and the sync device in two directions. The above-described information is transmitted as, for example, CEC (Consumer Electronics Control) data or CDC (Capability Discovery Channel) data from the source device to the sync device or from the sync device to the source device.

FIG. 15 shows the structure of CEC data which is transmitted through a CEC line. In the CEC line, one block of 10-bit data is transmitted for 4.5 ms. A start bit is placed at the head, a header block is placed next, and then an arbitrary number (n) of data blocks including data to be actually transmitted are placed. Function information is included in data blocks.

FIG. 16 is a diagram showing a structure example of a header block. In a header block, a logical address of an initiator and a logical address of a destination are placed. The logical address is set depending on the type of device.

FIG. 17 shows logical addresses which are set in accordance with the types of device. As shown in FIG. 17, for the respective types of device, 16 address values from "0" to "15" are set. 4-bit corresponding address values are placed to the logical address of the initiator and the logical address of the destination constituting the header block of FIG. 16.

Next, CDC data will be described. CDC is defined such that a physical layer is identical to CEC and a logical layer is different from CEC. Though not shown, the structure of CDC data is identical to the structure of CEC data shown in FIG. 15. That is, a start bit is placed at the head, a header block is placed next, and an arbitrary number (n) of data blocks including data to be actually transmitted are then placed.

Though not shown, the structure of a header block of CDC data is structurally identical to the header block of CEC data shown in FIG. 16. However, "15" is typically used in the logical address of the initiator and the logical address of the destination constituting the header block, without depending on the type of device. That is, the initiator is Unregistered, and the destination is Broadcast.

As described above, with regard to the transmission of CDC data, "15" is used for the logical addresses of the initiator and the destination in the header block, so it will not be necessary to acquire the logical addresses of the respective devices. A message by CDC data (CDC message) is said to be an initiator-unregistered broadcast message for CEC, and it is not known which device sends a message to which device.

Accordingly, in the case of the CDC message, in order to identify a physical connection path, the physical addresses of the initiator and the target are included in a message placed in the data blocks. That is, with regard to the transmission of the CDC message, physical addresses are used, instead of logical addresses.

In the case of CEC, a message, <Feature Abort>"This does not correspond" may not be returned with respect to a broadcast message. Therefore, it is assumed that for CDC, a message is typically returned taking into consideration this situation.

[Example of CDC Message]

As the command messages which are placed in the data blocks of CDC data, an <Exchange Supported Channels Info> message and an <Activate Supported Channels> message are defined. The <Exchange Supported Channels Info> message is a message which is used when function information is exchanged between two devices. The <Activate Supported Channels> message is a message which is used when a channel (transmission format) to be actually activated is confirmed and communication starts between two devices. Each message has, for example, a data structure described below.

TABLE 1

| <Exchange Supported Channels Info> | | | |
|---|---|---|---|
| [Physical Address] | 2 bytes | | : PA of Initiator |
| [Physical Address] | 2 bytes | | : PA of Target |
| [Supported Channels] | 1 byte | | |
|     [Audio Return Channel] | 1 bit | | : if initiator supports this channel, set this "1", else "0". |
|     [Ethernet Channel] | 1 bit | | : if initiator supports this channel, set this "1", else "0". |
|     [reserved] | 6 bits | (=000000) | |
| <Activate Supported Channels> | | | |
| [Physical Address] | 2 bytes | | : PA of Initiator |
| [Physical Address] | 2 bytes | | : PA of Target |
| [Supported Channels] | 1 byte | | |
|     [Audio Return Channel] | 1 bit | | : if initiator wants to activate this channel, set this "1". |
| | | | : if initiator wants to de-activate this channel, set this "0". |
|     [Ethernet Channel] | 1 bit | | : if initiator wants to activate this channel, set this "1". |
| | | | : if initiator wants to de-activate this channel, set this "0". |
|     [reserved] | 6 bits | (=000000) | |

The <Exchange Supported Channels Info> message will be described. The <Exchange Supported Channels Info> message has 5-byte data of first to fifth bytes. The physical address of an initiator is placed in the first and second byte, and the physical address of a target is placed in the third and fourth byte.

Function information of the initiator is placed in the fifth byte. The function information is information indicating that the relevant device is an eHDMI-compatible device, and includes information of channels with which the relevant device cope, that is, transmission formats (applications) with which the relevant device can cope.

One bit of the fifth byte, for example, the seventh bit (the highest-order bit) indicates whether or not the relevant device is an eHDMI-compatible device and can cope with the transmission format (application) of the SPDIF signal, that is, supports [Audio Return Channel]. This one bit of the fifth byte becomes "1" when [Audio Return Channel] is supported, and becomes "0" when [Audio Return Channel] is not supported.

A different bit of the fifth byte, for example, the sixth bit indicates whether or not the relevant device is an eHDMI-compatible device and can cope with the transmission format (application) of the Ethernet signal, that is, supports [Ethernet Channel]. This different bit of the fifth byte becomes "1" when [Ethernet Channel] is supported, and becomes "0" when [Ethernet Channel] is not supported.

The remaining 6 bits of the fifth byte, for example, the fifth to 0th bits are reserve bits and all become "0".

Next, the <Activate Supported Channels> message will be described. The <Activate Supported Channels> message has 5-byte data of first to fifth bytes. The physical address of the initiator is placed in the first and second bytes, and the physical address of the target is placed in the third and fourth bytes.

In the fifth byte, information of a channel (transmission format) which is requested to be activated by the initiator is placed. One bit of the fifth byte, for example, the seventh bit indicates whether or not the relevant device requests communication of the SPDIF signal, that is, channel activation of [Audio Return Channel]. This one bit of the fifth byte becomes "1" when activation is requested, and becomes "0" when activation is not requested.

A different bit of the fifth byte, for example, the sixth bit indicates whether or not the relevant device requests communication of the Ethernet signal, that is, channel activation of [Ethernet Channel]. This different bit of the fifth byte becomes "1" when activation is requested, and becomes "0" when activation is not requested.

The remaining 6 bits of the fifth byte, for example, the fifth to 0th bits are reserve bits and all become "0".

The rules of the <Exchange Supported Channels Info> message and the <Activate Supported Channels> message are defined as described below. That is, when a CDC device broadcasts an <Exchange Supported Channels Info> message, a CDC device having the physical address of a destination included in the message broadcasts an <Exchange Supported Channels Info> message including information (parameters) thereof.

When a CDC device broadcasts an <Activate Supported Channels> message, a CDC device having the physical address of a destination included in the message broadcasts an <Activate Supported Channels> message including information (parameters) thereof. If there is a channel (transmission format), which is supported by both devices, from the channels of [Audio Return Channel] and [Ethernet Channel] by function information exchanged through the <Exchange Supported Channels Info> message, communication by the relevant channel between the two devices is possible.

A CDC device means an eHDMI-compatible device which can cope with CDC data (<Exchange Supported Channels Info> message, <Activate Supported Channels> message, and the like). A Non-CDC device means an eHDMI-compatible device which may not cope with CDC data (<Exchange Supported Channels Info> message, <Activate Supported Channels> message, and the like).

[Exchange Sequence]

Figure 18:
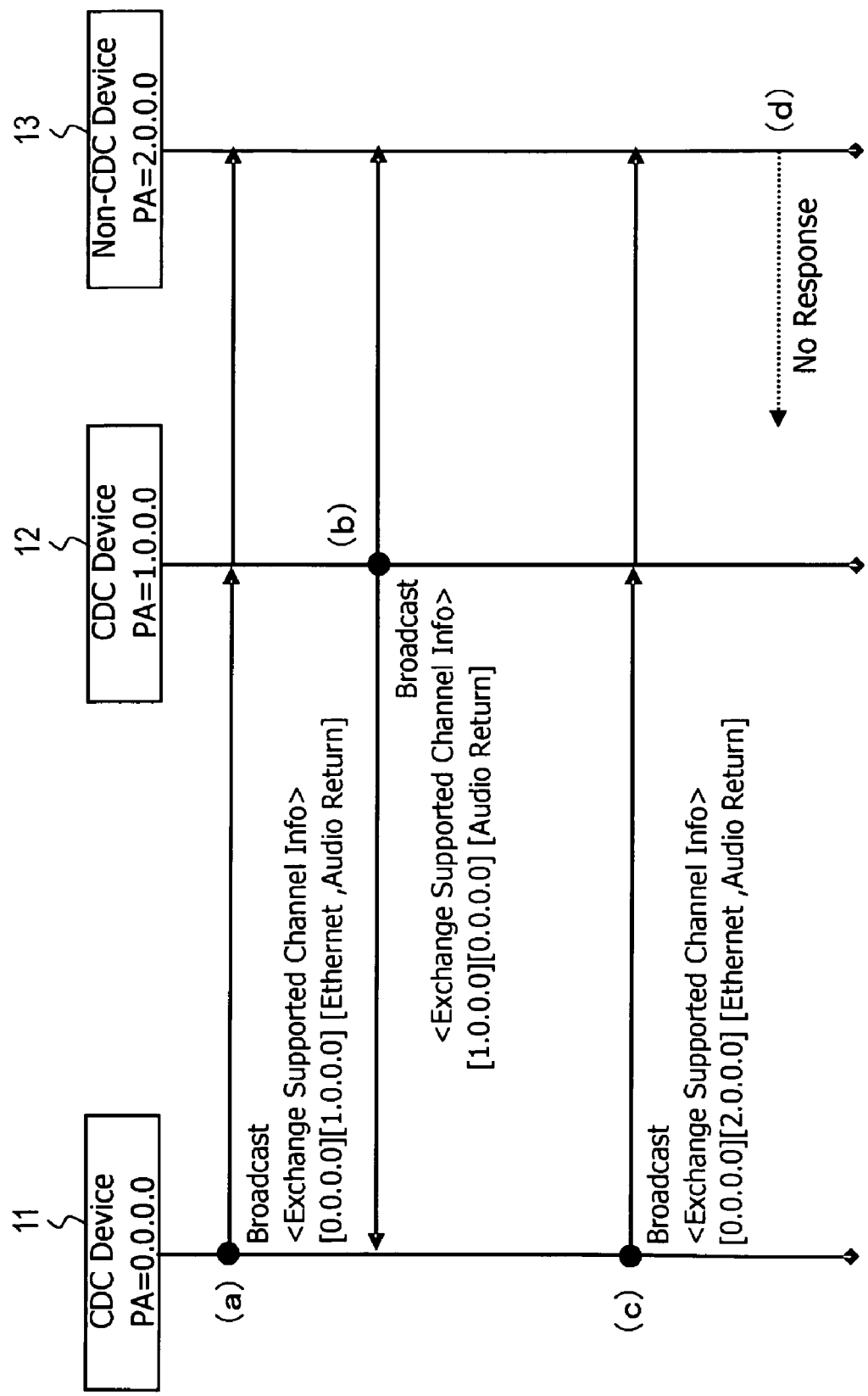
FIG. 18 is a sequence diagram illustrating a usage example of an <Exchange Supported Channels Info> message.
Figure 19:
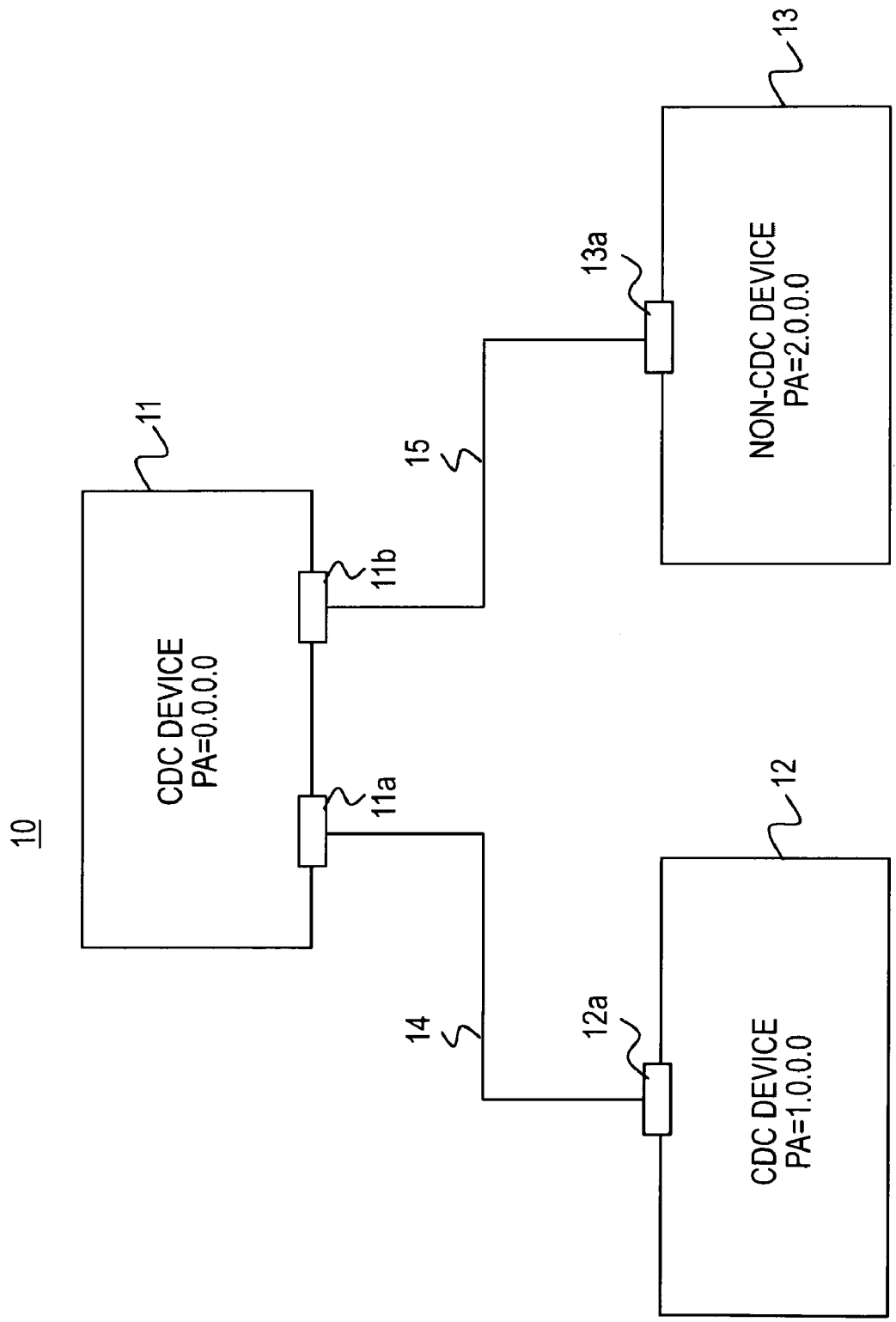
FIG. 19 is a diagram showing a device configuration example of an AV system.

Next, a usage example of an <Exchange Supported Channels Info> message will be described with reference to a sequence diagram of FIG. 18. Note that in this case, it is assumed that an AV system 10 having the device configuration of FIG. 19 is used. That is, the AV system 10 includes CDC devices 11 and 12 and a Non-CDC device 13. An HDMI terminal 11a of the CDC device 11 and an HDMI terminal 12a of the CDC device 12 are connected to each other through an HDMI cable 14. An HDMI terminal 11b of the CDC device 11 and an HDMI terminal 13a of the Non-CDC device 13 are connected to each other through an HDMI cable 15. The physical address of the CDC device 11 is [0.0.0.0], the physical address of the CDC device 12 is [1.0.0.0], and the physical address of the Non-CDC device 13 is [2.0.0.0].

Returning to FIG. 18, (a) the CDC device 11 broadcasts an <Exchange Supported Channels Info> message in order to exchange function information with the CDC device 12. In the <Exchange Supported Channels Info> message, the physical address of an initiator is [0.0.0.0], and the physical address of a target is [1.0.0.0]. The CDC device 11 also adds function information thereof to the <Exchange Supported Channels Info> message. For example, the <Exchange Supported Channels Info> message indicates that both channels of [Audio Return Channel] and [Ethernet Channel] are supported.

(b) The physical address of the target in the <Exchange Supported Channels Info> message broadcasting from the CDC device 11 corresponds to the physical address [1.0.0.0] of the CDC device 12. Thus, the CDC device 12 broadcasts an <Exchange Supported Channels Info> message. In the <Exchange Supported Channels Info> message, the physical address of an initiator is [1.0.0.0], and the physical address of a target is [0.0.0.0]. The CDC device 12 also adds function information thereof to the <Exchange Supported Channels Info> message. For example, in the <Exchange Supported Channels Info> message, it is described that both channels of [Audio Return Channel] and [Ethernet Channel] are supported.

In this way, the <Exchange Supported Channels Info> message is transmitted/received between the CDC device 11 and the CDC device 12. Thus, function information, that is, information indicating whether or not a device is an eHDMI-compatible device, and whether or not [Audio Return Channel] and [Ethernet Channel] are supported is exchanged.

(c) The CDC device 11 broadcasts the <Exchange Supported Channels Info> message in order to exchange function information with the Non-CDC device 13. In the <Exchange Supported Channels Info> message, the physical address of an initiator is [0.0.0.0], and the physical address of a target is [2.0.0.0]. The CDC device 11 also adds function information thereof to the <Exchange Supported Channels Info> message. For example, in the <Exchange Supported Channels Info> message, it is described that both channels of [Audio Return Channel] and [Ethernet Channel] are supported.

(d) Even if the physical address of the target in the <Exchange Supported Channels Info> message broadcasting from the CDC device 11 corresponds to the physical address

[2.0.0.0] of the Non-CDC device 13, the Non-CDC device 13 does not respond. In this case, when there is no response even if two seconds have passed on the basis of the maximum 2-seconds rule, the CDC device 11 recognizes that the Non-CDC device 13 does not support both channels of [Audio Return Channel] and [Ethernet Channel].

[Activate/De-Activate Sequence]

Figure 20:
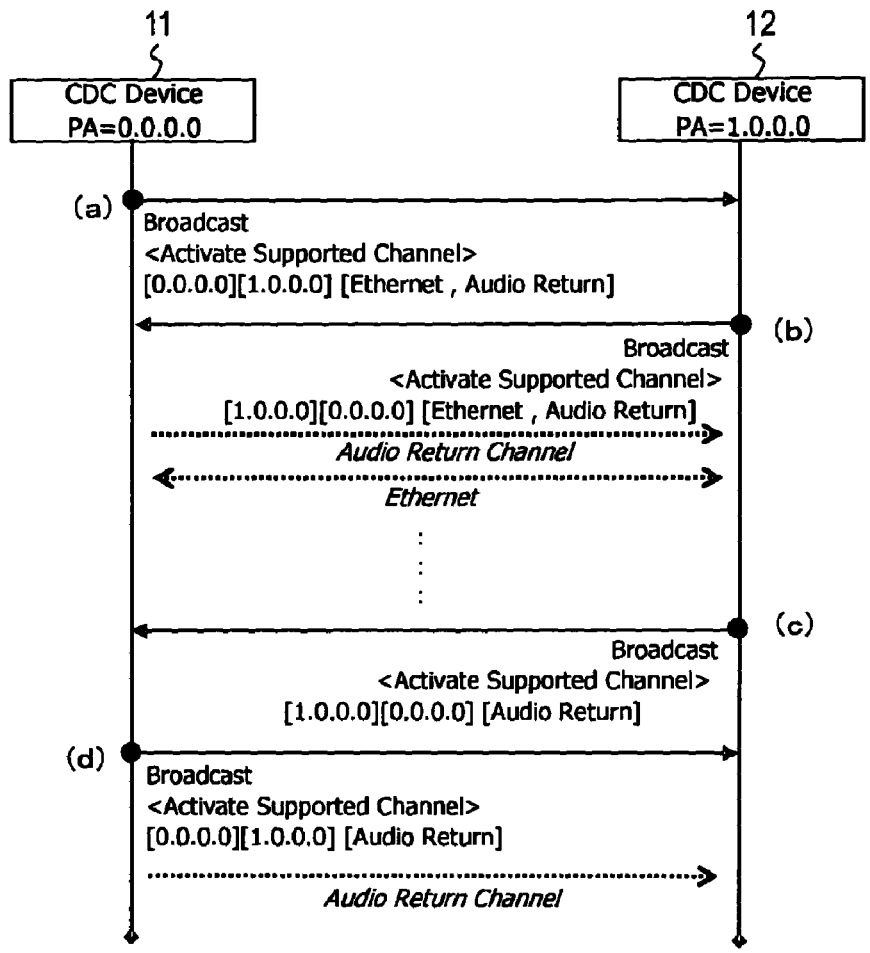
FIG. 20 is a sequence diagram illustrating a usage example of an <Activate Supported Channels> message.

Next, a usage example of <Activate Supported Channels> message will be described with reference to a sequence diagram of FIG. 20. In this case, it is assumed that, in the AV system 10 having the device configuration of FIG. 19, communication is performed between the CDC device 11 and the CDC device 12, which exchange function information by using the <Exchange Supported Channels Info> messages, as described above.

(a) The CDC device 11 broadcasts an <Activate Supported Channels> message in order to confirm a channel (transmission format) which is to be actually activated and to start communication with the CDC device 12. In the <Activate Supported Channels> message, the physical address of an initiator is [0.0.0.0], and the physical address of a target is [1.0.0.0]. The CDC device 11 also places information of a channel (transmission format) which is requested to be activated by the CDC device 11 in the <Activate Supported Channels> message. For example, in the <Activate Supported Channels> message, it is described that activation of both channels of [Audio Return Channel] and [Ethernet Channel] is requested.

(b) The physical address of the target in the <Activate Supported Channels> message broadcasting from the CDC device 11 corresponds to the physical address [1.0.0.0] of the CDC device 12, so the CDC device 12 broadcasts an <Activate Supported Channels> message. In the <Activate Supported Channels> message, the physical address of an initiator [1.0.0.0], and the physical address of a target is [0.0.0.0]. The CDC device 12 also places information of a channel (transmission format) subscribing to the activation request in the <Activate Supported Channels> message. For example, in the <Activate Supported Channels> message, it is described that the activation request of both channels of [Audio Return Channel] and the [Ethernet Channel] is agreed.

In this way, the <Activate Supported Channels> message is transmitted/received between the CDC device 11 and the CDC device 12, then, a channel (transmission format) which can be activated commonly by both devices is confirmed, and communication starts. In the example of FIG. 20, in both of the CDC device 11 and the CDC device 12, the activation of [Audio Return Channel] and [Ethernet Channel] is possible. Then, both channels (transmission formats) are activated, and communication starts.

(c) Thereafter, the CDC device 12 broadcasts an <Activate Supported Channels> message in order to stop communication of [Ethernet Channel] for Ethernet communication through network terminals, for example. In the <Activate Supported Channels> message, the physical address of an initiator is [1.0.0.0], and the physical address of a target is [0.0.0.0]. In the <Activate Supported Channels> message, it is described that the channel which is requested to be activated by the CDC device 12 to be activated is [Audio Return Channel], and [Ethernet Channel] is removed.

(d) The physical address of the target in the <Activate Supported Channels> message broadcasting from the CDC device 12 corresponds to the physical address [0.0.0.0] of the CDC device 11, so the CDC device 11 broadcasts an <Activate Supported Channels> message. In the <Activate Supported Channels> message, the physical address of an initiator is [0.0.0.0], and the physical address of a target is [1.0.0.0].

The CDC device 11 also places information of a channel (transmission format) subscribing to the activation request in the <Activate Supported Channels> message. For example, in the <Activate Supported Channels> message, it is described that the CDC device 11 subscribes to the activation request of [Audio Return Channel].

In this way, the <Activate Supported Channels> messages are transmitted/received between the CDC device 11 and the CDC device 12, then, a transmission format (application) which can be activated commonly by both devices is reconfirmed, communication by [Ethernet Channel] is aborted, and only communication by [Audio Return Channel] is continuously performed.

Figure 21:
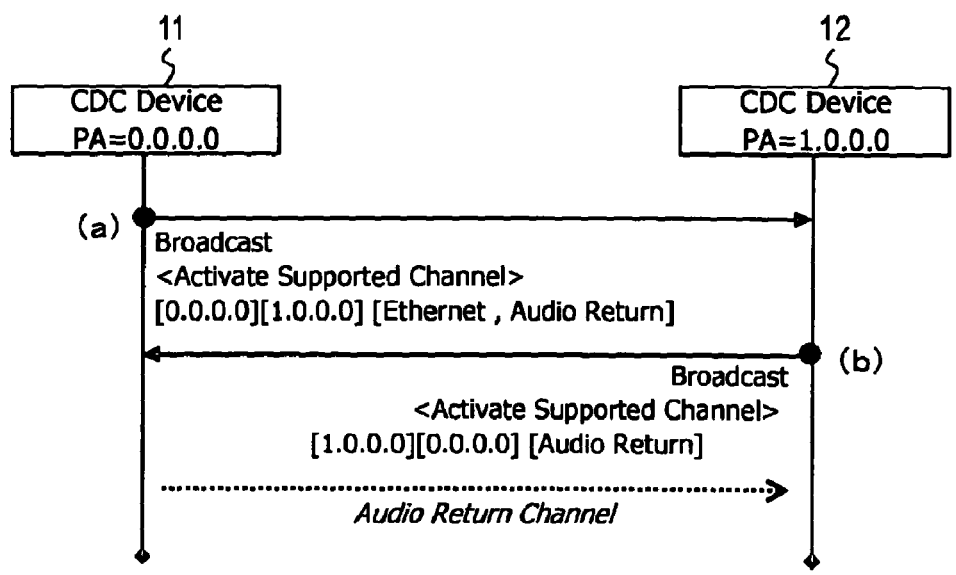
FIG. 21 is a sequence diagram illustrating a usage example of an <Activate Supported Channels> message.

Next, another usage example of an <Activate Supported Channels> message will be described with reference to a sequence diagram of FIG. 21. In this case, it is assumed that, in the AV system 10 having the device configuration of FIG. 19, communication is performed between the CDC device 11 and the CDC device 12, which exchange function information by using the <Exchange Supported Channels Info> messages, as described above.

(a) The CDC device 11 broadcasts an <Activate Supported Channels> message in order to confirm a channel (transmission format) to be actually activated and to start communication with the CDC device 12. In the <Activate Supported Channels> message, the physical address of an initiator is [0.0.0.0], and the physical address of a target is [1.0.0.0]. The CDC device 11 also places information of a channel (transmission format), which is requested to be activated by the CDC device 11, in the <Activate Supported Channels> message. For example, in the <Activate Supported Channels> message, it is described that the activation of both channels of [Audio Return Channel] and [Ethernet Channel] is requested.

(b) The physical address of the target in the <Activate Supported Channels> message broadcasting from the CDC device 11 corresponds to the physical address [1.0.0.0] of the CDC device 12, so the CDC device 12 broadcasts an <Activate Supported Channels> message. In the <Activate Supported Channels> message, the physical address of an initiator is [1.0.0.0], and the physical address of a target is [0.0.0.0]. The CDC device 12 also places information of a channel (transmission format) subscribing to the activation request in the <Activate Supported Channels> message. For example, in the <Activate Supported Channels> message, it is described that the CDC device 12 subscribes to the activation request of [Audio Return Channel].

In this way, the <Activate Supported Channels> messages are transmitted/received between the CDC device 11 and the CDC device 12, then, a channel (transmission format) which can be activated commonly by both devices is confirmed, and communication starts. In the example of FIG. 21, while the CDC device 11 requests the activation of both channels of [Audio Return Channel] and [Ethernet Channel], the CDC device subscribes to the activation of only [Audio Return Channel]. For this reason, only [Audio Return Channel] is activated, and communication starts.

Transmission/reception of the <Activate Supported Channels> message is performed, for example, after the exchange of function information is performed by using the <Exchange Supported Channels Info> messages, and the functions of both devices are known. Thereafter, transmission/reception of the <Activate Supported Channels> message is performed at an arbitrary timing, for example, at the time of communication channel change.

[Another Example of CDC Message]

In this example, as the command messages which are placed in the data blocks of CDC data, an <CDC_ARC_Set State> message, an <CDC_ARC_Report State> message, and an <CDC_ARC_Inquiry State> message are further defined. The <CDC_ARC_Set State> message is a message which is used to set [Audio Return Channel]. The <CDC_ARC_Report State> message is a message which is a response when the <CDC_ARC_Set State> message or <CDC_ARC_Inquiry State> message is received. The <CDC_ARC_Inquiry State> message is a message which requests the <CDC_ARC_Report State> message. Each message has, for example, a data structure described below.

TABLE 2

```
<CDC_ARC_SetState>
[Physical Address]         2bytes    : PA of Initiator
[Physical Address]         2bytes    : PA of Target
[ARC State]                1byte
   [ARC Forward/Reverse]             1bit: If initiator wants to forward ARC, set this "1"
   [ACT(Audio Clock Transmission) State]
                           7bits
      [On/Off]             1bit: If initiator wants to activate ACT, set this "1"
      [Forward/Reverse]    1bit: If initiator wants to forward ACT, set this "1"
      [Frequency]          4bits
      [Pass Through]       1bit
<CDC_ARC_ReportState>
[Physical Address]         2bytes    : PA of Initiator
[Physical Address]         2bytes    : PA of Target
[ARC State]                1byte
   [ARC Forward/Reverse]             1bit: If initiator supports to forward ARC, set this "1"
   [ACT(Audio Clock Transmission) State]
                           7bits
      [On/Off]             1bit: If initiator supports ACT, set this "1"
      [Forward/Reverse]    1bit: If initiator supports to forward ACT, set this "1"
      [Frequency]          4bits
      [Pass Through]       1bit
<CDC_ARC_InquiryState>
[Physical Address]         2bytes    : PA of Initiator
[Physical Address]         2bytes    : PA of Target
```

The <CDC_ARC_Set State> message will be described. The <CDC_ARC_Set State> message has 5-byte data of first to fifth bytes. The physical address of an initiator is placed in the first and second bytes, and the physical address of a target is placed in the third and fourth bytes.

Information of the transmission direction of the SPDIF signal is placed in the seventh bit (the highest-order bit) of the fifth byte. That is, the seventh bit indicates whether or not the SPDIF signal is transmitted from an initiator to a target, that is, forward transmission is performed. The seventh bit of the fifth byte becomes "1" when forward transmission is performed, and becomes "0" when the SPDIF signal is transmitted from a target to an initiator, that is, reverse transmission is performed, not forward transmission.

Information regarding transmission of the clock signal is placed in the remaining 7 bits of the fifth byte. The sixth bit of the fifth byte indicates whether or not to perform transmission of the clock signal. The sixth bit of the fifth byte becomes "1" when transmission of the clock signal is performed, and becomes "0" when transmission of the clock signal is not performed. The fifth bit of the fifth byte indicates whether or not the clock signal is transmitted from an initiator to a target, that is, forward transmission is performed. The fifth bit of the fifth byte becomes "1" when forward transmission is performed, and becomes "0" when the clock signal is transmitted from a target to an initiator, that is, reverse transmission is performed, not forward transmission.

The fourth to first bits of the fifth byte indicate the type of rate (clock frequency) of the SPDIF signal which can be treated by an initiator. The 0th bit of the fifth byte indicates whether or not an initiator sends the clock signal to a different device through a target, that is, whether or not there is a path-through function.

Next, the <CDC_ARC_Report State> message will be described. The <CDC_ARC_Report State> message has 5-byte data of first to fifth bytes. The physical address of an initiator is placed in the first and second bytes, and the physical address of a target is placed in the third and fourth bytes.

Information of the transmission direction of the SPDIF signal is placed in the seventh bit (the highest-order significant bit) of the fifth byte. That is, the seventh bit indicates whether or not forward transmission is supported in the <CDC_ARC_Set State> message. The seventh bit of the fifth byte becomes "1" when forward transmission is supported, and becomes "0" when forward transmission is not supported and reverse transmission is supported.

Information regarding the transmission of the clock signal is placed in the remaining 7 bits of the fifth byte. The sixth bit of the fifth byte indicates whether or not transmission of the clock signal is supported in the <CDC_ARC_Set State> message. The sixth bit of the fifth byte becomes "1" when transmission of the clock signal is supported, and becomes "0" when transmission of the clock signal is not supported. The fifth bit of the fifth byte indicates whether or not forward transmission of the clock signal is supported in the <CDC_ARC_Set State> message. The fifth bit of the fifth byte becomes "1" when forward transmission of the clock signal is supported, and becomes "0" when reverse transmission is supported, not forward transmission of the clock signal.

The fourth to first bits of the fifth byte indicate the type of rate (clock frequency) of the SPDIF signal which can be treated by an initiator. The 0th bit of the fifth byte indicates whether or not an initiator sends the clock signal to a different device through a target, that is, whether or not there is a path-through function.

Next, the <CDC_ARC_Inquiry State> message will be described. The <CDC_ARC_Inquiry State> message has 4-byte data of first to fourth bytes. The physical address of an initiator is placed in the first and second bytes, and the physical address of a target is placed in the third and fourth bytes.

As described above, the AV system 100 shown in FIG. 1 (FIGS. 12 and 13) is configured such that the clock signal CLK synchronized with the SPDIF signal can be transmitted from the sync device 120 to the source device 110, together with the SPDIF signal. In this case, even though there is a time axis fluctuation (jitter) in the SPDIF signal, the SPDIF receiving circuit 115 of the source device 110 can correctly extract data from the SPDIF signal on the basis of the clock signal CLK transmitted from the sync device 120. Therefore, the transmission quality of the SPDIF signal is improved.

The AV system 100 shown in FIG. 1 is configured such that the clock signal CLK synchronized with the SPDIF signal can be transmitted from the sync device 120 to the source device 110, together with the SPDIF signal. In this case, in the source device 110, it will not be necessary to reproduce a clock signal synchronized with an SPDIF signal by using the PLL circuit, and there will be no influence by jitter due to the PLL circuit.

The AV system 100 shown in FIG. 1 is configured such that the clock signal CLK synchronized with the SPDIF signal can be transmitted from the sync device 120 to the source device 110, together with the SPDIF signal. In this case, in the source device 110, it will not be necessary to reproduce the clock signal synchronized with the SPDIF signal by using the PLL circuit. Therefore, the transmission rate of the PLL circuit is not limited, and the SPDIF signal can be transmitted at a higher rate.

In the AV system 100 of FIG. 1, the clock signal which is transmitted from the sync device 120 to the source device 110 is transmitted as a differential signal through a pair of lines (the reserve line 501 and the HPD line 502). Therefore, the clock signal CLK can be transmitted with high quality, and even a high-frequency signal can be prevented from being influenced by EMI or the like.

[Copyright Protection]

In the AV system 100 of FIG. 1, it is considered that, for copyright protection, encryption is performed on the SPDIF signal which is transmitted from the sync device 120 to the source device 110. For example, copyright protection may be performed by, for example, DTCP (Digital Transmission Content Protection) or the like. In this case, authentication and key exchange may be performed between the source device 110 and the sync device 120 by the above-described CDC function.

Figure 22:
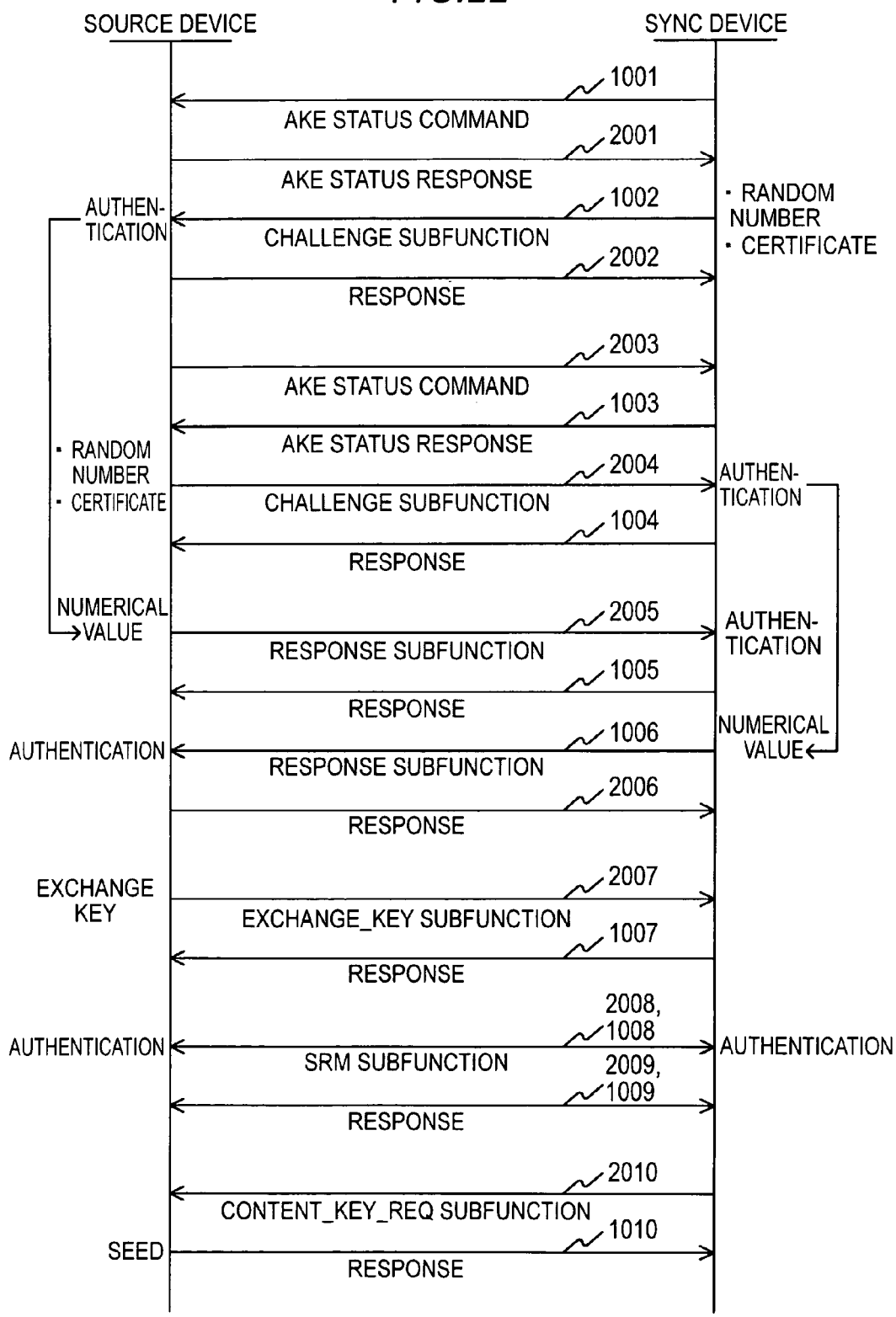
FIG. 22 is a diagram showing a sequence example of authentication and key exchange processing.

FIG. 22 shows a sequence example of authentication and key exchange processing. In FIG. 22, a sync device corresponds to the source device 110 of HDMI in the AV system 100 of FIG. 1. Further, in FIG. 22, a source device corresponds to the sync device 120 of HDMI in the AV system 100 of FIG. 1.

According to the DTCP standard, the authentication and key exchange processing is called AKE (Authentication and Key Exchange) processing. In this case, prior to exchanging digital data, the sync device is authorized as a device which can appropriately handle copy control information, and then encryption and key exchange for encryption and decoding are performed. The source device encrypts digital data, and the sync device decodes encrypted digital data. Therefore, protection of digital contents in the sync device is ensured, and copying of digital contents by other devices is suppressed.

At the time of authentication, the processing starts from the sync device such that processing is not duplicated. First, the sync device examines the status of the source device by an AKE status command 1001. As the result of examination, if a response indicating that the status can be received as an AKE status response 2001 is obtained from the source device, the sync device issues a CHALLENGE subfunction 1002 with a random number and a certificate attached. The certificate is issued to each device by the digital transmission licensing administrator (DTLA) which is a DTCP administrative organization. The source device authorizes the certificate from the sync device and returns the result to the sync device as a response 2002. Then, the source device performs the same procedure from the source device side (2003, 1003, 2004, and 1004).

Next, the source device calculates a predetermined numerical value on the basis of the random number received from the sync device, and transmits the numerical value to the sync device as a RESPONSE subfunction 2005. Similarly, the sync device calculates a predetermined numerical value on the basis of the random number from the source device, and transmits the numerical value to the source device as a RESPONSE subfunction 1006. A device which receives the RESPONSE subfunction 2005 or 1006 performs authentication.

The source device transmits an exchange key as an EXCHANGE_KEY subfunction 2007. If the sync device requests a seed for calculating a contents key by a CONTENT_KEY_REQ subfunction 2010, the source device transmits the seed as a response 1010. Accordingly, the sync device calculates the contents key from the exchange key and the seed. The copy control information of contents includes four kinds of copy never, copy one generation, no more copies, and copy free, and with regard to the former three kinds, encryption is performed. Three kinds of contents keys are provided to correspond to the three kinds of copy control information.

In SRM subfunctions 1008 and 2008, exchange of SRMs (System Renewability Message) is performed. The SRM is used to transmit an updated message to an authorized device such that devices other than the authorized device are not authorized. A device which receives the SRM subfunction performs authentication and confirms whether or not the transmitted SRM is correct.

In the sequence example of the authentication and key exchange processing of FIG. 22, the three kinds of keys are all exchanged by the procedure called Full Authentication. Alternatively, only one kind of key is exchanged by the simple procedure called Restricted Authentication. In the case of Restricted Authentication, authentication can be performed within substantially half of the time of Full Authentication. In the sequence example of the authentication and key exchange of FIG. 22, copyright protection is performed by DTCP, but copyright protection technique other than DTCP may be applied. For example, when the HDCP (High-bandwidth Digital Content Protection system) is used for encryption of the SPDIF signal, encryption may be performed by using contents keys which are authorized and generated by the DDC line of the HDMI, or the like.

2. Second Embodiment

An AV system 100A according to a second embodiment has the same configuration as the AV system 100 of FIG. 1 as a whole. In the AV system 100A, a difference from the AV system 100 is a clock system including the SPDIF transmitting circuit 125 of the sync device 120 and the SPDIF receiving circuit 115 of the source device 110.

[Configuration Example of Source-Side Transmitting/Receiving Circuit, Sync-Side Transmitting/Receiving Circuit, and the Like]

Figure 23:
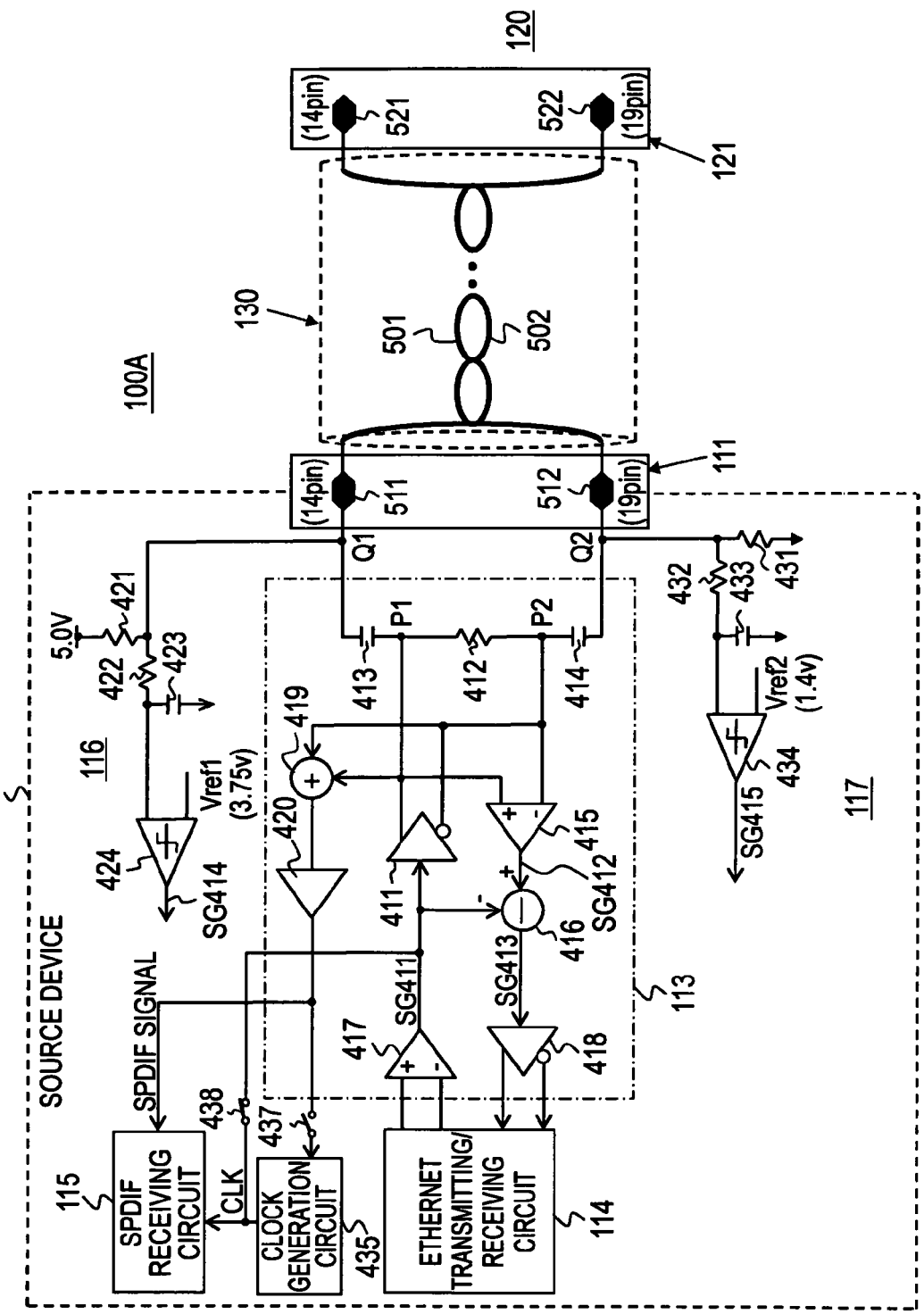
FIG. 23 is a connection diagram showing a configuration example of a source-side transmitting/receiving circuit, a sync device model detection circuit, a plug connection detection circuit, and the like in a source device according to a second embodiment.

FIG. 23 shows a configuration example of a source-side transmitting/receiving circuit 113, a sync device model detection circuit 116, a plug connection detection circuit 117, and the like of a source device 110 in the AV system 100A. In FIG. 23, corresponding parts in FIG. 12 are represented by the same reference numerals, and detailed descriptions thereof will be omitted.

In FIG. 23, a difference from FIG. 12 is a clock system including the SPDIF receiving circuit 115. That is, in FIG. 23, instead of the switch 436 in FIG. 12, connection switches 437 and 438 are provided.

The output signal of the addition circuit 419 is supplied to the SPDIF receiving circuit 115 through the amplifier 420 and also to the clock generation circuit 435 through the connection switch 437. As described above, when the SPDIF signal is transmitted as an in-phase signal through the reserve line and the HPD line, the output signal of the addition circuit 419 becomes the SPDIF signal. The connection switch 437 is connected/disconnected under the control of the control section (CPU) (not shown). The connection switch 437 is put in the non-connection state when the clock signal CLK is transmitted to the sync device 120 side, and is put in the connection state when the clock signal CLK is not transmitted to the sync device 120 side.

The clock signal CLK generated by the clock generation circuit 435 is supplied as an operation clock to the SPDIF receiving circuit 115 and also to the input side of the LAN signal transmitting circuit 411 through the connection switch 438. The connection switch 438 is connected/disconnected under the control of the control section (CPU) (not shown). The connection switch 438 is put in the connection state when the clock signal is transmitted to the sync device 120 side, and is put in the non-connection state when the clock signal is not transmitted to the sync device 120 side.

Figure 24:
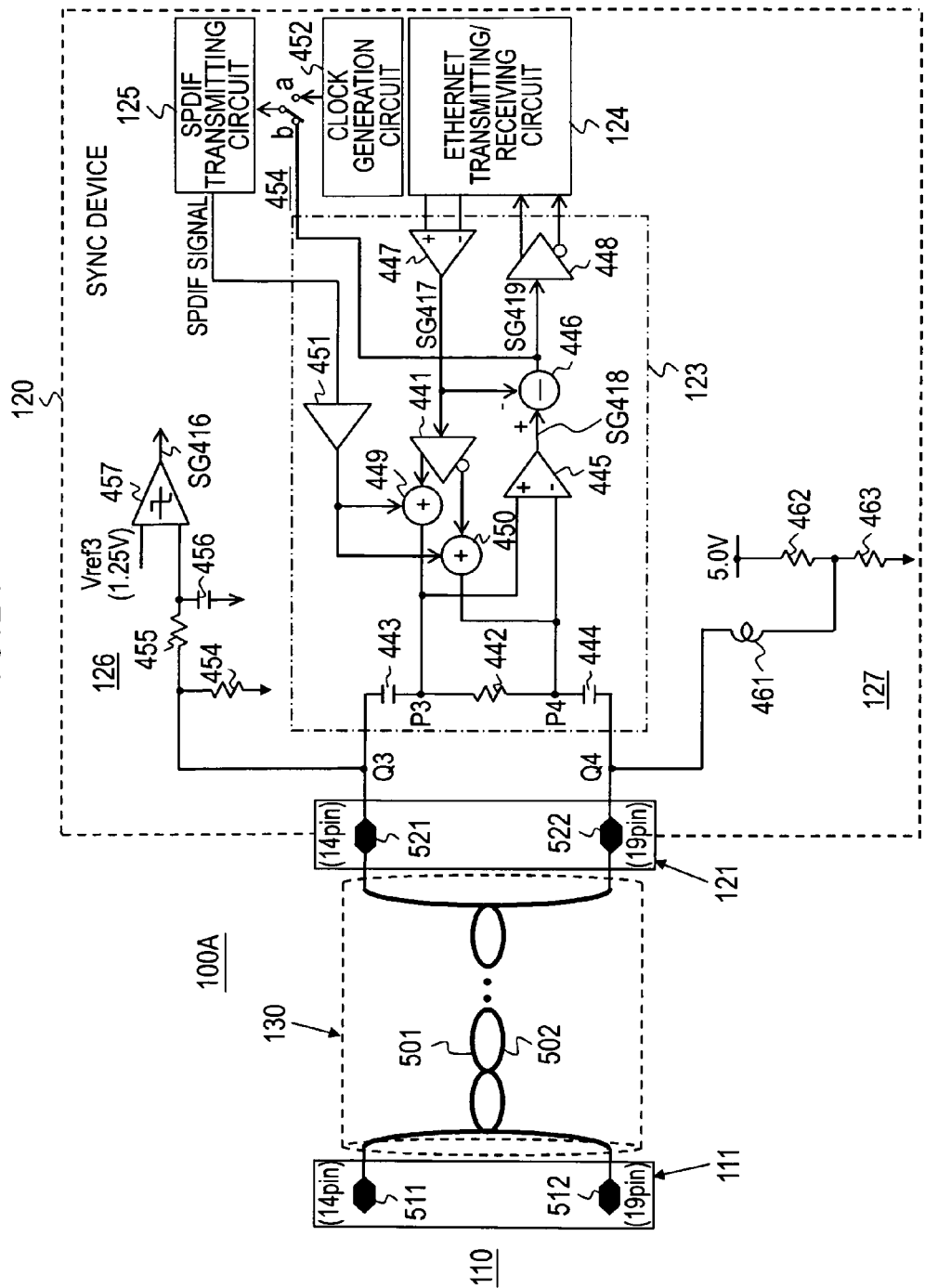
FIG. 24 is a connection diagram showing a configuration example of a source-side transmitting/receiving circuit, a sync device model detection circuit, a plug connection detection circuit, and the like in a sync device according to the second embodiment.

FIG. 24 shows a configuration example of a sync-side transmitting/receiving circuit 123, a source device model detection circuit 126, a plug connection transfer circuit 127, and the like of a sync device 120 in the AV system 100A. In FIG. 24, corresponding parts in FIG. 13 are represented by the same reference numerals, and detailed descriptions thereof will be omitted.

In FIG. 24, a difference from FIG. 13 is a clock system including the SPDIF transmitting circuit 125. That is, in FIG. 24, instead of the connection switch 453 in FIG. 13, a switch 454 is provided.

The received signal SG419 obtained by the subtraction circuit 446 is supplied as differential output to the Ethernet transmitting/receiving circuit 124 through the amplifier 448 and also to the fixed terminal b of the switch 454. When the LAN signal (Ethernet signal) is transmitted as a differential signal through the reserve line and the HPD line, the received signal SG419 becomes the LAN signal. Meanwhile, when the clock signal CLK is transmitted as a differential signal through the reserve line and the HPD line, the received signal SG419 becomes the clock signal CLK.

The clock signal generated by the clock generation circuit 452 is supplied to the fixed terminal a of the switch 454. A clock signal obtained at the movable terminal of the switch 454 is supplied as an operation clock to the SPDIF transmitting circuit 125. The switch 454 is switched under the control of the control section (CPU) (not shown). When the clock signal CLK transmitted from the source device 110 side is used, the switch 454 is switched to the terminal b. Meanwhile, when the clock signal generated by the clock generation circuit 452 is used, the switch 454 is switched to the terminal a.

The operation of the AV system 100A shown in FIGS. 23 and 24 will be described. The LAN communication operation, the SPDIF signal transmission operation, the model detection operation, and the plug connection detection operation are the same as in the AV system 100 shown in FIGS. 1, 12, and 13, and descriptions thereof will be omitted. Here, the operation of a clock system including the SPDIF transmitting circuit 125 of the sync device 120 and the SPDIF receiving circuit 115 of the source device 110 will be described.

The SPDIF transmitting circuit 125 uses either the clock signal generated by the clock generation circuit 452 in the sync device 120 or the clock signal CLK transmitted from the source device 110.

First, the state where the clock signal generated by the clock generation circuit 452 is used will be described. In this case, in the sync device 120, the switch 454 is switched to the terminal a. Accordingly, the clock signal generated by the clock generation circuit 452 is supplied to the SPDIF transmitting circuit 125. Further, in the source device 110, the connection switch 438 is put in the non-connection state, and the clock signal CLK generated by the clock generation circuit 435 is not transmitted to the sync device 120.

In this case, in the source device 110, the connection switch 437 is put in the connection state, and the received SPDIF signal is supplied to the clock generation circuit 435. For this reason, the clock signal generated by the clock generation circuit 435 is deemed to be generated by the PLL circuit with the SPDIF signal as a reference signal and synchronized with the SPDIF signal. Accordingly, the SPDIF receiving circuit 115 performs data extraction, decoding, and the like on the SPDIF signal on the basis of the clock signal synchronized with the SPDIF signal to acquire data, such as audio data or the like.

Next, the state where the clock signal CLK transmitted from the source device 110 is used will be described. In the source device 110, the connection switch 438 is put in the connection state. In this case, the connection switch 437 is put in the non-connection state, and the received SPDIF signal is not supplied to the clock generation circuit 435. For this reason, the clock generation circuit 435 is put in a free running state. The clock signal CLK generated by the clock generation circuit 435 is supplied to the input side of the LAN signal transmitting circuit 411. A differential signal (a positive output signal or a negative output signal) corresponding to the clock signal CLK is output from the LAN signal transmitting circuit 411. The differential signal is connected to the nodes P1 and P2 and transmitted to the sync device 120 through a pair of lines (the reserve line 501 and the HPD line 502) of the HDMI cable 130.

In the sync device 120, the switch 454 is connected to the terminal b. In the sync device 120, the input side of the LAN signal receiving circuit 445 is connected to the nodes P3 and P4. For this reason, the output signal SG418 of the LAN signal receiving circuit 445, and accordingly, the output signal SG419 of the subtraction circuit 446 becomes the clock signal CLK transmitted from the source device 110. The clock signal CLK is supplied to the SPDIF transmitting circuit 125 through the switch 454.

In the source device 110, the SPDIF signal which is supplied to the SPDIF receiving circuit 115 is obtained in the SPDIF transmitting circuit 125 of the sync device 120 with the clock signal CLK transmitted from the source device 110 as an operation clock. For this reason, in the source device 110, the SPDIF signal which is supplied to the SPDIF receiving circuit 115 is synchronized with the clock signal CLK which is generated by the clock generation circuit 435. Accordingly, the SPDIF receiving circuit 115 performs data extraction, decoding, and the like on the SPDIF signal on the basis of the clock signal CLK synchronized with the SPDIF signal to acquire audio data.

As described above, in the AV system 100A shown in FIGS. 23 and 24, the source device 110 can transmit the clock signal CLK as a differential signal to the sync device 120 through the transmission path including the reserve line and the HPD line. The sync device 120 can extract and use the clock signal CLK which is transmitted as a differential signal from the source device 110 through the transmission path including the reserve line and the HPD line.

As described above, in the sync device 120, the state where the clock signal CLK is transmitted from the source device 110 and used, or the state where the clock signal generated by the clock generation circuit 452 is set in advance. This setting is performed by the exchange of the CDC messages regarding the clock signal between the source device 110 and the sync device 120, as described above. For example, when the source device 110 supports transmission of the clock signal, and the sync device 120 supports reception of the clock signal, the state where the clock signal CLK is transmitted from the source device 110 to the sync device 120 is set.

The clock signal from the source device 110 to the sync device 120 is transmitted as a differential signal through the transmission path including the reserve line and the HPD line. As described above, the LAN signal (Ethernet signal) between the source device 110 and the sync device 120 is also transmitted as a differential signal through the transmission path including the reserve line and the HPD line. For this reason, the clock signal from the source device 110 to the sync device 120 is not transmitted when communication of the LAN signal (Ethernet signal) is performed between the source device 110 and the sync device 120. Accordingly, the clock signal will have no influence on the communication of the LAN signal (Ethernet signal).

As described above, the AV system 100A shown in FIGS. 23 and 24 is configured such that the clock signal CLK can be transmitted from the source device 110 to the sync device 120. In this case, the SPDIF signal which is synchronized with the clock signal transmitted from the source device 110 is transmitted from the sync device 120 to the source device 110. For this reason, even if there is a time axis fluctuation (jitter) in the SPDIF signal, the source device 110 can correctly extract data from the received SPDIF signal on the basis of the clock signal CLK thereof. Therefore, the transmission quality of the SPDIF signal is improved. As a result, the signal transmission quality is improved.

The AV system 100A shown in FIGS. 23 and 24 is configured such that the clock signal CLK can be transmitted from the source device 110 to the sync device 120. In this case, the SPDIF signal which is synchronized with the clock signal CLK transmitted from the source device 110 is transmitted from the sync device 120 to the source device 110. For this reason, in the source device 110, it will not be necessary to reproduce the clock signal synchronized with the SPDIF signal by using the PLL circuit, and there will be no influence by jitter due to the PLL circuit.

The AV system 100A shown in FIGS. 23 and 24 is configured such that the clock signal CLK can be transmitted from the source device 110 to the sync device 120. In this case, the SPDIF signal which is synchronized with the clock signal CLK transmitted from the source device 110 is transmitted from the sync device 120 to the source device 110. For this reason, in the source device 110, it will not be necessary to reproduce the clock signal synchronized with the SPDIF signal by using the PLL circuit. Therefore, the transmission rate is not limited by the PLL circuit, and the SPDIF signal can be transmitted at a higher rate.

In the AV system 100A of FIGS. 23 and 24, the clock signal which is transmitted from the source device 110 to the sync device 120 is transmitted as a differential signal through a pair of lines (the reserve line 501 and the HPD line 502). Therefore, the clock signal CLK can be transmitted with high quality, and even a high-frequency signal can be prevented from being influenced by EMI or the like.

3. Third Embodiment

[Configuration Example of AV System]

Figure 25:
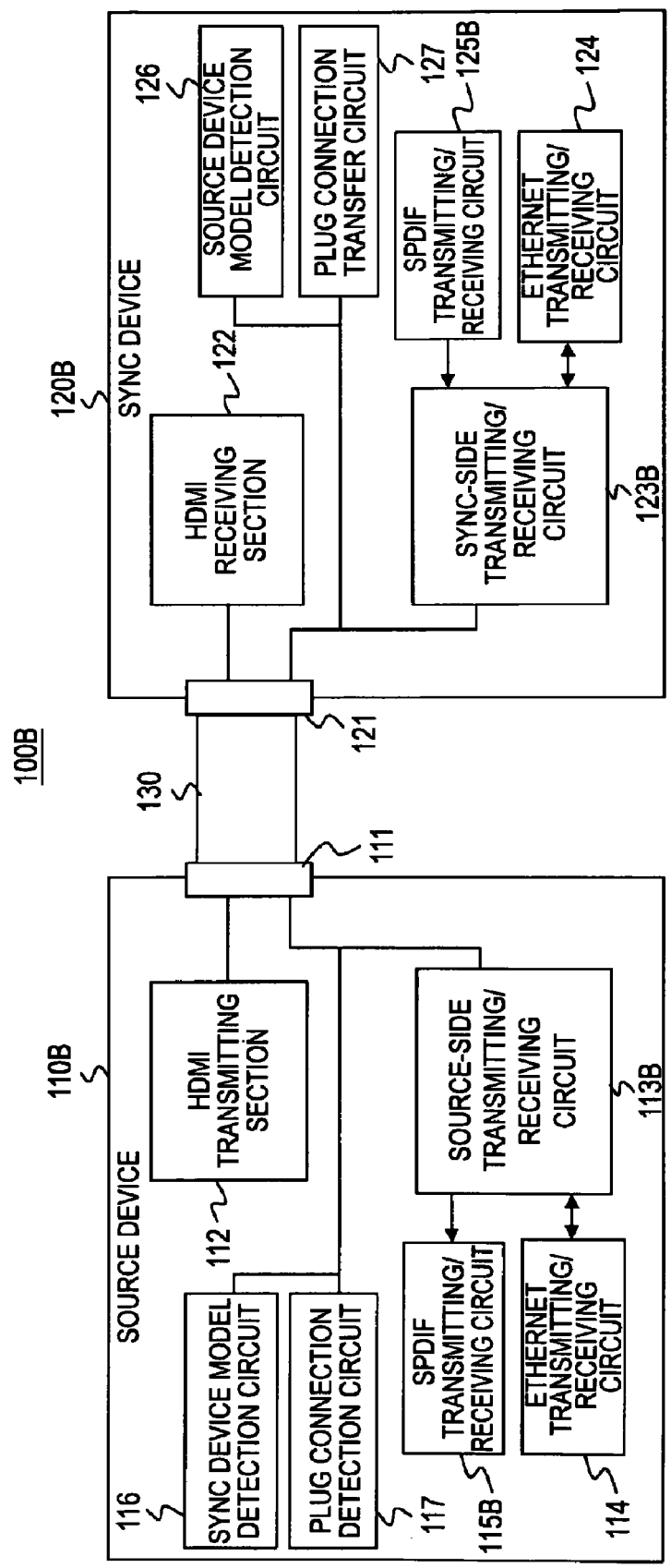
FIG. 25 is a block diagram showing a configuration example of an AV system according to a third embodiment.

FIG. 25 shows a configuration example of an AV system 100B according to an embodiment. The AV system 100B has a source device 110B, such as a disk recorder or the like, and a sync device 120B, such as a television receiver or the like. In the AV system 100B, the source device 110B and the sync device 120B are eHDMI-compatible devices. Note that an eHDMI-compatible device means that a communication section is provided which performs communication using a communication path including a reserve line and an HPD line constituting an HDMI cable.

The AV system 100 shown in FIG. 1 is configured such that the SPDIF signal can be transmitted from the sync device 120 to the source device 110 in a single direction. In contrast, the AV system 100B shown in FIG. 25 is configured such that the SPDIF signal can be transmitted in two directions between the source device 110B and the sync device 120B. In FIG. 25, corresponding parts in FIG. 1 are represented by the same reference numerals, and detailed descriptions thereof will be omitted.

The source device 110B and the sync device 120B are connected to each other through the HDMI cable 130. That is, the source device 110B has an HDMI terminal 111, and the sync device 120B has an HDMI terminal 121. One end of the HDMI cable 130 is connected to the HDMI terminal 111 of the source device 110B, and the other end of the HDMI cable 130 is connected to the HDMI terminal 121 of the sync device 120B.

The source device 110B has an HDMI transmitting section 112, a source-side transmitting/receiving circuit 113B, a sync device model detection circuit 116, and a plug connection detection circuit 117, which are connected to the HDMI terminal 111. An Ethernet transmitting/receiving circuit 114 and an SPDIF transmitting/receiving circuit 115B are connected to the source-side transmitting/receiving circuit 113B.

The source-side transmitting/receiving circuit 113B interfaces the Ethernet signal, which is transmitted through the reserve line and the HPD line constituting the HDMI cable 130, between the Ethernet transmitting/receiving circuit 114 and the HDMI cable 130. The source-side receiving circuit 113B interfaces the SPDIF signal, which is transmitted through the reserve line and the HPD line constituting the HDMI cable 130, between the SPDIF transmitting/receiving circuit 115B and the HDMI cable 130. The details of the source-side transmitting/receiving circuit 113B will be described.

The SPDIF transmitting/receiving circuit 115B is a circuit which is used to transmit/receive the SPDIF signal. The SPDIF transmitting/receiving circuit 115B includes a transmitting section and a receiving section based on the SPDIF standard. Other parts of the source device 110B are the same as those of the source device 110 in the AV system 100 of FIG. 1.

The sync device 120B has an HDMI receiving section 122, a sync-side transmitting/receiving circuit 123B, a source device model detection circuit 126, and a plug connection transfer circuit 127, which are connected to the HDMI terminal 121. An Ethernet transmitting/receiving circuit 124 and an SPDIF transmitting/receiving circuit 125B are connected to the sync-side transmitting/receiving circuit 123B.

The sync-side transmitting/receiving circuit 123B interfaces the Ethernet signal, which is transmitted through the reserve line and the HPD line constituting the HDMI cable 130, between the Ethernet transmitting/receiving circuit 124 and the HDMI cable 130. The sync-side transmitting/receiving circuit 123B also interfaces the SPDIF signal, which is transmitted through the reserve line and the HPD line constituting the HDMI cable 130, between the SPDIF transmitting/receiving circuit 125B and the HDMI cable 130. The details of the sync-side transmitting/receiving circuit 123B will be described below.

The SPDIF transmitting/receiving circuit 125B is a circuit which is used to transmit/receive the SPDIF signal. The SPDIF transmitting/receiving circuit 125B includes a transmitting section and a receiving section based on the SPDIF standard. Other parts of the sync device 120B are the same as those of the sync device 120 in the AV system 100 of FIG. 1.

The operation of the AV system 100B shown in FIG. 25 will be described. Video and sound data which should be transmitted from the source device 110B to the sync device 120B is transmitted from the HDMI transmitting section 112 of the source device 110B to the sync device 120B through the HDMI cable 130 by communication based on HDMI. The HDMI receiving section 122 of the sync device 120B receives video and sound data transmitted from the source device 110B through the HDMI cable 130 by communication based on HDMI. The sync device 120B performs image display and sound output on the basis of video and sound data acquired as above.

Bidirectional communication of the Ethernet signal based on the Internet protocol (IP) is performed between the Ethernet transmitting/receiving circuit 114 of the source device 110B and the Ethernet transmitting/receiving circuit 124 of the sync device 120B through the HDMI cable 130.

Transmission/reception of the SPDIF signal is performed between the SPDIF transmitting/receiving circuit 115B of the source device 110B and the SPDIF transmitting/receiving circuit 125B of the sync device 120B through the HDMI cable 130. In the transmitting sections of the SPDIF transmitting/receiving circuits 115B and 125B, data, such as audio data or the like, is processed and transmitted as the SPDIF signal. In the receiving sections of the SPDIF transmitting/receiving circuits 115B and 125B, data extraction, decoding, and the like are performed on the received SPDIF signal to acquire data, such as audio data or the like.

[Configuration Example of Source-Side Transmitting/Receiving Circuit, Sync-Side Transmitting/Receiving Circuit, and the Like]

Figure 26:
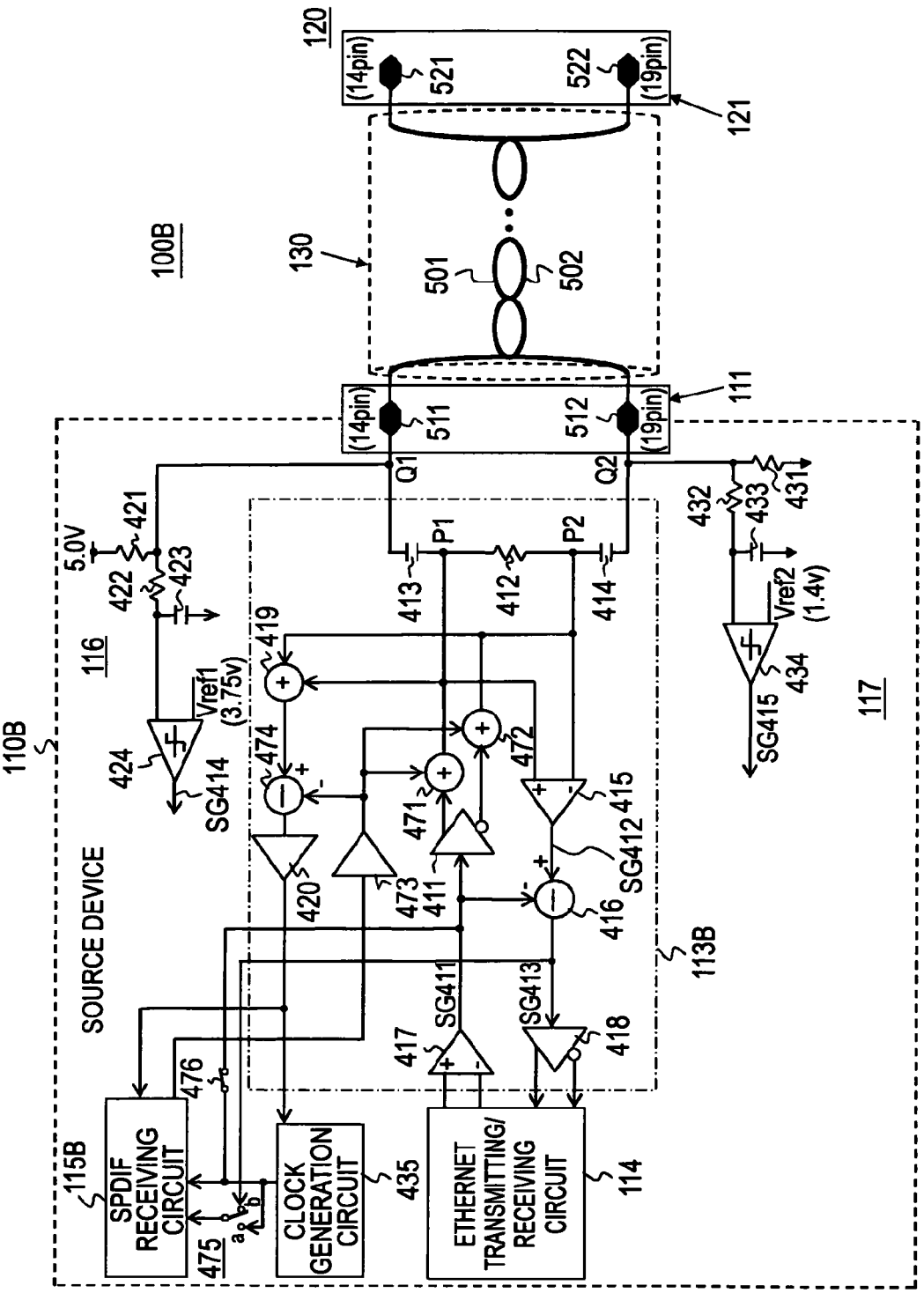
FIG. 26 is a connection diagram showing a configuration example of a source-side transmitting/receiving circuit, a sync device model detection circuit, a plug connection detection circuit, and the like in a source device according to the third embodiment.

FIG. 26 shows a configuration example of the source-side transmitting/receiving circuit 113B, the sync device model detection circuit 116, the plug connection detection circuit 117, and the like of the source device 110B. In FIG. 26, corresponding parts in FIG. 12 are represented by the same reference numerals, and detailed descriptions thereof will be omitted. In FIG. 26, a difference from FIG. 12 is a portion related to the transmission of the SPDIF signal in the SPDIF transmitting/receiving circuit 115B and the source-side transmitting/receiving circuit 113B.

The node P1 of the AC coupling capacitor 413 and the terminating resistor 412 is connected to the output side of an addition circuit 471 and also to the positive input side of the LAN signal receiving circuit 415. The node P2 of the AC coupling capacitor 414 and the terminating resistor 412 is connected to the output side of an addition circuit 472 and also to the negative input side of the LAN signal receiving circuit 415.

One input side of the addition circuit 471 is connected to the positive output side of the LAN signal transmitting circuit 411, and the SPDIF signal output from the SPDIF transmitting/receiving circuit 115B is supplied to the other input side of the addition circuit 471 through an amplifier 473. One input side of the addition circuit 472 is connected to the negative output side of the LAN signal transmitting circuit 411, and the SPDIF signal output from the SPDIF transmitting circuit 115B is supplied to the other input side of the addition circuit 472 through the amplifier 473.

The node P1 of the AC coupling capacitor 413 and the terminating resistor 412 is connected to one input terminal of the addition circuit 419. The node P2 of the AC coupling capacitor 414 and the terminating resistor 412 is connected to the other input terminal of the addition circuit 419. The output signal of the addition circuit 419 is input to the positive-side terminal of a subtraction circuit 474. The output signal of the amplifier 473 is supplied to the negative-side terminal of the subtraction circuit 474.

When the SPDIF signal is transmitted as an in-phase signal from the sync device 120B through the reserve line and the HPD line, the output signal of the subtraction circuit 474 becomes the SPDIF signal. The output signal of the subtraction circuit 474 is supplied to the SPDIF transmitting/receiving circuit 115B and also to the clock generation circuit 435 through the amplifier 420.

The received signal SG413 obtained by the subtraction circuit 416 is supplied as differential output to the Ethernet transmitting/receiving circuit 114 through the amplifier 418 and also to the fixed terminal b of a switch 475. When the LAN signal (Ethernet signal) is transmitted as a differential signal through the reserve line and the HPD line, the received signal SG413 becomes the LAN signal. When the clock signal is transmitted as a differential signal through the reserve line and the HPD line, the received signal SG413 becomes the clock signal.

Other parts of the source-side transmitting/receiving circuit 113B are the same as those of the source-side transmitting/receiving circuit 113 of the source device 110 shown in FIG. 12.

The clock signal generated by the clock generation circuit 435 is supplied to the fixed terminal a of the switch 475. The clock signal obtained at the movable terminal of the switch 475 is supplied to the SPDIF transmitting/receiving circuit 115B as the operation clock of the receiving section.

The switch 475 is switched under the control of the control section (CPU) (not shown). The switch 475 is switched to the terminal b when the clock signal transmitted from the sync device 120B is used as the operation clock of the receiving section. Meanwhile, the switch 475 is switched to the terminal a when the clock signal generated by the clock generation circuit 435 is used as the operation clock of the receiving section.

The clock signal output from the clock generation circuit 435 is supplied to the SPDIF transmitting/receiving circuit 115B as the operation clock of the transmitting section. For this reason, the SPDIF signal output from the SPDIF transmission/receiving circuit 115B is synchronized with the clock signal output from the clock generation circuit 435. The clock signal output from the clock generation circuit 435 is supplied to the input side of the LAN signal transmitting circuit 411 through a connection switch 476. The connection switch 476 is connected/disconnected under the control of the control section (CPU) (not shown). The connection switch 453 is put in the connection state when the clock signal is transmitted to the sync device 120B side, and is put in the non-connection state when the clock signal is not transmitted to the sync device 120B side.

Figure 27:
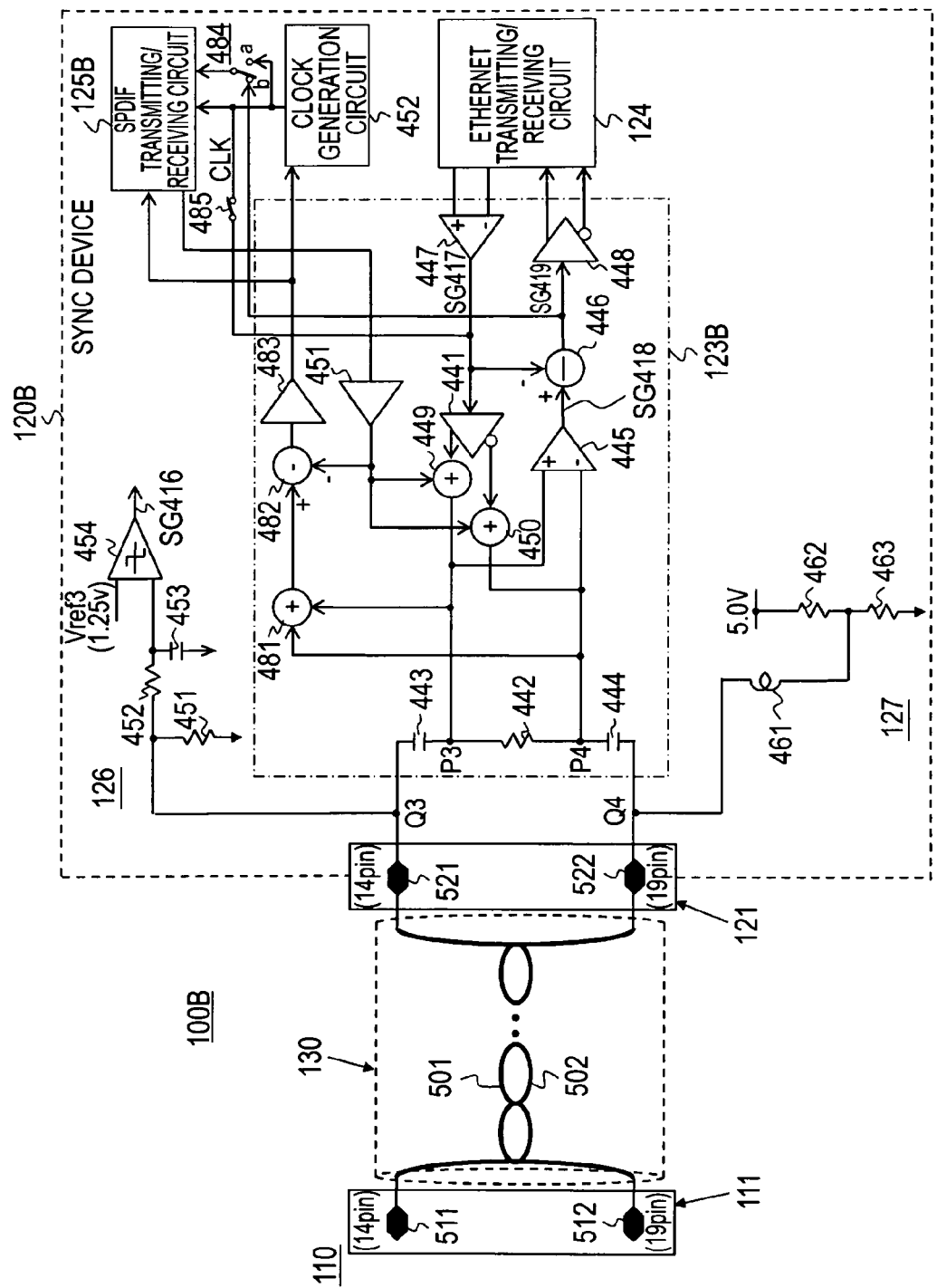
FIG. 27 is a connection diagram showing a configuration example of a source-side transmitting/receiving circuit, a sync device model detection circuit, a plug connection detection circuit, and the like in a sync device according to the third embodiment.
Figure 28:
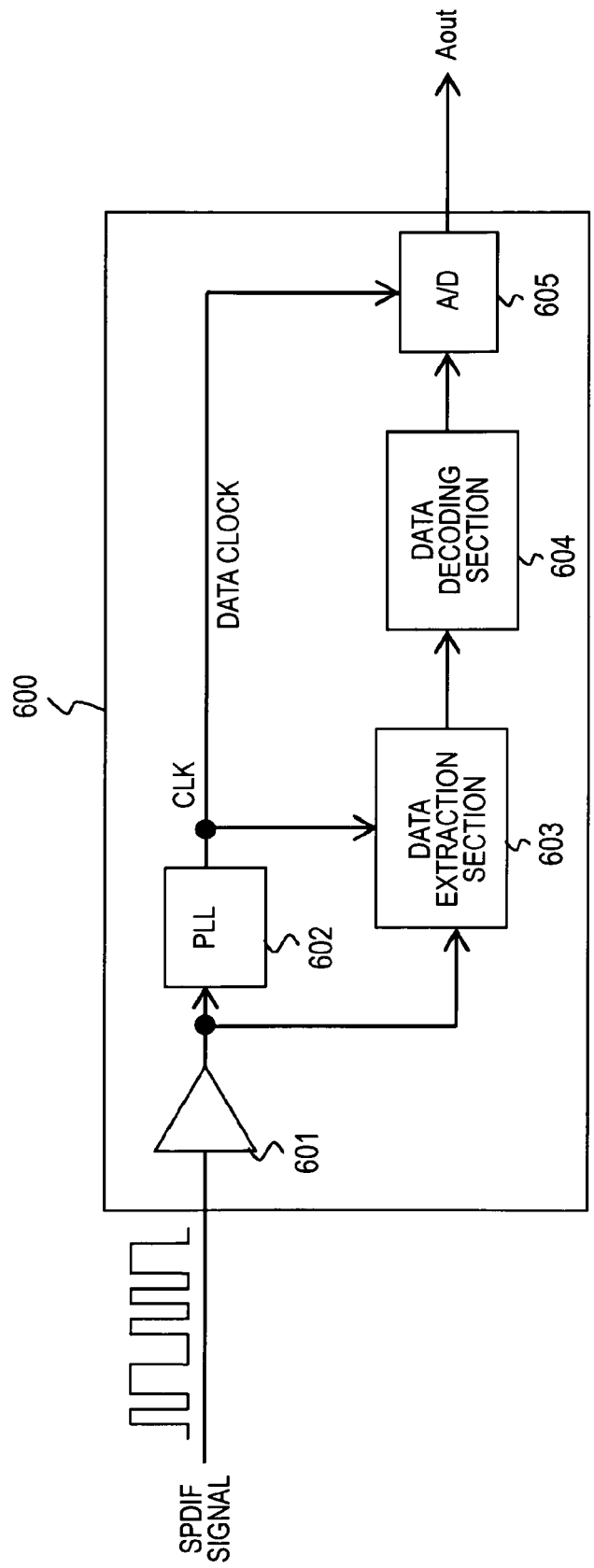
FIG. 28 is a block diagram showing a general configuration example of a receiver in an audio transmission system using an SPDIF.

FIG. 27 shows a configuration example of the sync-side transmitting/receiving circuit 123B, the sync device model detection circuit 126, the plug connection transfer circuit 127, and the like of the sync device 120B. In FIG. 27, corresponding parts in FIG. 13 are represented by the same reference numerals, and detailed descriptions thereof will be omitted. In FIG. 27, a difference from FIG. 13 is a portion related to the reception of the SPDIF signal in the SPDIF transmitting/receiving circuit 125B and the sync-side transmitting/receiving circuit 123B.

The node P3 of the AC coupling capacitor 443 and the terminating resistor 442 is connected to the output side of the addition circuit 449 and also to the positive input side of the LAN signal receiving circuit 445. The node P4 of the AC coupling capacitor 444 and the terminating resistor 442 is connected to the output side of the addition circuit 450 and also to the negative input side of the LAN signal receiving circuit 445.

One input side of the addition circuit 449 is connected to the positive output side of the LAN signal transmitting circuit 441, and the SPDIF signal output from the SPDIF transmitting/receiving circuit 125B is supplied to the other input side of the addition circuit 449 through the amplifier 451. One input side of the addition circuit 450 is connected to the negative output side of the LAN signal transmitting circuit 441, and the SPDIF signal output from the SPDIF transmitting circuit 125B is supplied to the other input side of the addition circuit 450 through the amplifier 451.

The node P3 of the AC coupling capacitor 443 and the terminating resistor 442 is connected to one input terminal of an addition circuit 481. The node P4 of the AC coupling capacitor 444 and the terminating resistor 442 is connected to the other input terminal of the addition circuit 481. The output signal of the addition circuit 481 is input to the positive-side terminal of a subtraction circuit 482. The output signal of the amplifier 451 is supplied to the negative-side terminal of the subtraction circuit 482.

When the SPDIF signal is transmitted as an in-phase signal from the source device 110 through the reserve line and the HPD line, the output signal of the subtraction circuit 482 becomes the SPDIF signal. The output signal of the subtraction circuit 482 is supplied to the SPDIF transmitting/receiving circuit 125B and also to the clock generation circuit 452 through an amplifier 483.

The received signal SG419 obtained by the subtraction circuit 446 is supplied as differential output to the Ethernet transmitting/receiving circuit 124 through the amplifier 448 and also to the fixed terminal b of a switch 484. When the LAN signal (Ethernet signal) is transmitted as a differential signal through the reserve line and the HPD line, the received signal SG419 becomes the LAN signal. When the clock signal is transmitted as a differential signal through the reserve line and the HPD line, the received signal SG419 becomes the clock signal.

Other parts of the sync-side transmitting/receiving circuit 123B are the same as those of the source-side transmitting/receiving circuit 123 of the source device 110 shown in FIG. 13.

The clock signal generated by the clock generation circuit 452 is supplied to the fixed terminal a of the switch 484. A clock signal obtained at the movable terminal of the switch 484 is supplied to the SPDIF transmitting/receiving circuit 125B as the operation clock of the receiving section.

The switch 484 is switched under the control of the control section (CPU) (not shown). The switch 484 is switched to the terminal b when the clock signal transmitted from the source device 110B side is used as the operation clock of the receiving section. Meanwhile, the switch 484 is switched to the terminal a when the clock signal generated by the clock generation circuit 452 is used as the operation clock of the receiving section.

The clock signal output from the clock generation circuit 452 is supplied to the SPDIF transmitting/receiving circuit 125B as the operation clock of the transmitting section. For this reason, the SPDIF signal which is output from the SPDIF transmitting/receiving circuit 125B is synchronized with the clock signal which is output from the clock generation circuit 452. The clock signal output from the clock generation circuit 452 is supplied to the input side of the LAN signal transmitting circuit 441 through a connection switch 485. The connection switch 485 is connected/disconnected under the control of the control section (CPU) (not shown). The connection switch 485 is put in the connection state when the clock signal is transmitted to the source device 110B side, and is put in the non-connection state when the clock signal is not transmitted to the source device 110B side.

[Operation of AV System]

The operation of the AV system 100B shown in FIGS. 26 and 27 will be described. The LAN communication operation, the model detection operation, and the plug connection detection operation are the same as those of the AV system 100 shown in FIGS. 12 and 13, and descriptions thereof will be omitted.

[Transmission Operation of SPDIF Signal]

The transmission operation of the SPDIF signal in the configuration of FIGS. 26 and 27 will be described. In the sync device 120B, the SPDIF signal output from the SPDIF transmitting/receiving circuit 125B is supplied to the nodes P3 and P4 through the amplifier 451 and the addition circuits 449 and 450. When this happens, the SPDIF signal is transmitted as an in-phase signal to the source device 110B through a pair of lines (the reserve line 501 and the HPD line 502) of the HDMI cable 130.

In the source device 120B, the SPDIF signal output from the SPDIF transmitting/receiving circuit 115B is supplied to the nodes P1 and P2 through the amplifier 473 and the addition circuits 471 and 472. When this happens, the SPDIF signal is transmitted as an in-phase signal to the sync device 120B through a pair of lines (the reserve line 501 and the HPD line 502) of the HDMI cable 130.

In the source device 110B, the nodes P1 and P2 are connected to the input side of the addition circuit 419. For this reason, an added signal of the SPDIF signal transmitted from the SPDIF transmitting/receiving circuit 115B to the sync device 120B and the SPDIF signal transmitted from the sync device 120B is obtained as the output signal of the addition circuit 419. In the subtraction circuit 474, the output signal (transmission SPDIF signal) of the amplifier 473 is subtracted from the output signal of the addition circuit 419. Thus, the output signal of the subtraction circuit 473 becomes the SPDIF signal which is transmitted from the sync device 120B. The SPDIF signal is supplied to the SPDIF transmitting/receiving circuit 115B through the amplifier 420.

In the sync device 120B, the nodes P3 and P4 are connected to the input side of the addition circuit 481. For this reason, an added signal of the SPDIF signal transmitted from the SPDIF transmitting/receiving circuit 125B to the source device 110B and the SPDIF signal transmitted from the source device 110B is obtained as the output signal of the addition circuit 481. In the subtraction circuit 482, the output signal (transmission SPDIF signal) of the amplifier 451 is subtracted from the output signal of the addition circuit 481. For this reason, the output signal of the subtraction circuit 482 becomes the SPDIF signal which is transmitted from the source device 110B. The SPDIF signal is supplied to the SPDIF transmitting/receiving circuit 125B of the amplifier 483.

As described above, bidirectional transmission of the SPDIF signal is possible between the SPDIF transmitting/receiving circuit 115B of the source device 110B and the SPDIF transmitting/receiving circuit 125B of the sync device 120B.

[Clock Signal]

The SPDIF transmitting/receiving circuit 115B of the source device 110B performs data extraction, decoding, and the like on the received SPDIF signal on the basis of the clock signal corresponding to the SPDIF signal to acquire data, such as audio data or the like. The SPDIF transmitting/receiving circuit 115B uses either the clock signal generated by the clock generation circuit 435 in the source device 110B or the clock signal transmitted from the sync device 120B as the operation clock of the receiving section.

First, the state where the clock signal generated by the clock generation circuit 435 is used will be described. In this case, in the sync device 120B, the connection switch 485 is put in the non-connection state, and the clock signal CLK generated by the clock generation circuit 452 is not transmitted to the source device 110B. In this case, in the source device 110B, the switch 436 is switched to the terminal a. Accordingly, the clock signal generated by the clock generation circuit 435 is supplied to the SPDIF receiving circuit 115 as the operation clock of the receiving section.

The clock signal generated by the clock generation circuit 435 is deemed to be generated by the PLL circuit with the received SPDIF signal as a reference signal and synchronized with the SPDIF signal. Accordingly, the receiving section of the SPDIF transmitting/receiving circuit 115B performs data extraction, decoding, and the like on the SPDIF signal on the basis of the clock signal CLK synchronized with the SPDIF signal to acquire data, such as audio data or the like.

Next, the state where the clock signal transmitted from the sync device 120B is used will be described. In the sync device 120B, the connection switch 485 is put in the connection state. The clock signal generated by the clock generation circuit 452 is supplied to the input side of the LAN signal transmitting circuit 441. A differential signal (a positive output signal or a negative output signal) corresponding to the clock signal is output from the LAN signal transmitting circuit 441. The differential signal is supplied to the nodes P3 and P4 and transmitted to the source device 110B through a pair of lines (the reserve line 501 and the HPD line 502) of the HDMI cable 130.

In the source device 110B, the switch 475 is switched to the terminal b. Then, in the source device 110B, the input side of the LAN signal receiving circuit 415 is connected to the nodes P1 and P2. For this reason, the output signal SG412 of the LAN signal receiving circuit 415, and accordingly, the output signal SG413 of the subtraction circuit 416 becomes the clock signal CLK transmitted from the sync device 120B. The clock signal CLK is supplied to the SPDIF transmitting/receiving circuit 115B through the switch 475 as the operation clock of the receiving section.

The SPDIF signal which is supplied to the SPDIF transmitting/receiving circuit 115B is obtained in the SPDIF transmitting/receiving circuit 125B of the sync device 120B with the clock signal CLK generated by the clock generation circuit 452 as an operation clock. For this reason, in the source device 110B, the clock signal CLK which is transmitted from the sync device 120B and supplied to the SPDIF transmitting/receiving circuit 115B is synchronized with the received SPDIF signal which is supplied to the SPDIF transmitting/receiving circuit 115B. Accordingly, the SPDIF transmitting/receiving circuit 115B performs data extraction, decoding, and the like on the SPDIF signal on the basis of the clock signal synchronized with the SPDIF signal to acquire data, such as audio data or the like.

The above description has been made focusing on the operation clock of the receiving section of the SPDIF transmitting/receiving circuit 115B of the source device 110B. Although a detailed description will be omitted, the same is applied to the operation clock of the receiving section of the SPDIF transmitting/receiving circuit 125B of the sync device 120B. That is, either the clock signal generated by the clock generation circuit 452 in the sync device 120B or the clock signal transmitted from the source device 110B is used as the operation clock of the receiving section.

As described above, the sync device 120B is configured such that the clock signal can be transmitted as a differential signal to the source device 110B through the transmission path including the reserve line and the HPD line. Meanwhile, the source device 110B is configured such that the clock signal transmitted as a differential signal from the sync device 120B through the transmission path including the reserve line and the HPD line can be extracted and used.

As described above, in the source device 110B, the state where the clock signal is transmitted from the sync device 120B and used, or the state where the clock signal generated by the clock generation circuit 435 of the source device 110B is used is set in advance. This setting is performed by the exchange of the CDC messages regarding the control signal between the source device 110B and the sync device 120B, as described above. For example, when the sync device 120B supports transmission of the clock signal, and when source device 110B supports reception of the clock signal, the state where the clock signal is transmitted from the sync device 120B to the source device 110B is set.

As described above, the source device 110B is configured such that the clock signal can be transmitted as a differential signal to the sync device 120B through the transmission path including the reserve line and the HPD line. Meanwhile, the sync device 120B is configured such that the clock signal transmitted as a differential signal from the source device 110B through the transmission path including the reserve line and the HPD line can be extracted and used.

As described above, in the sync device 120B, the state where the clock signal is transmitted from the source device 110B and used, or the state where the clock signal generated by the clock generation circuit 452 is used is set in advance. This processing is performed by the exchange of the CDC messages regarding the clock signal between the source device 110B and the sync device 120B. For example, when the source device 110B supports transmission of the clock signal, and the sync device 120B supports reception of the clock signal, the state where the clock signal is transmitted from the source device 110B to the sync device 120B is set.

The clock signal is transmitted as a differential signal through the transmission path including the reserve line and the HPD line. As described above, the LAN signal (Ethernet signal) between the source device 110B and the sync device 120B is also transmitted as a differential signal through the transmission path including the reserve line and the HPD line. For this reason, the clock signal is not transmitted when communication of the LAN signal (Ethernet signal) is performed between the source device 110B and the sync device 120B. Therefore, the clock signal will have no influence on the communication of the LAN signal (Ethernet signal).

As described above, the AV system 100B of FIGS. 26 and 27 is configured such that the clock signal synchronized with the SPDIF signal is transmitted from the transmission side of the SPDIF signal to the reception side, together with the SPDIF signal. In this case, in the reception-side SPDIF transmitting/receiving circuit, even if there is a time axis fluctuation (jitter) in the SPDIF signal, data can be correctly extracted from the SPDIF signal on the basis of the clock signal transmitted from the transmission side. Therefore, the transmission quality of the SPDIF signal is improved.

The AV system 100B shown in FIGS. 26 and 27 is configured such that the clock signal synchronized with the SPDIF signal can be transmitted from the transmission side of the SPDIF signal to the reception side, together with the SPDIF signal. In this case, on the reception side, it will not be necessary to reproduce the clock signal synchronized with the SPDIF signal by using the PLL circuit, and there will be no influence by jitter due to the PLL circuit.

The AV system 100B shown in FIGS. 26 and 27 is configured such that the clock signal synchronized with the SPDIF signal can be transmitted from the transmission side of the SPDIF signal to the reception side, together with the SPDIF signal. In this case, on the reception side, it will not be necessary to reproduce the clock signal synchronized with the SPDIF signal by using the PLL circuit. Therefore, the transmission rate is not limited by the PLL circuit, and the SPDIF signal can be transmitted at a higher rate.

In the AV system 100B of FIGS. 26 and 27, the clock signal which is transmitted from the transmission side of the SPDIF signal to the reception side is transmitted as a differential signal through a pair of lines (the reserve line 501 and the HPD line 502). Therefore, the clock signal CLK can be transmitted with high quality, and even a high-frequency signal can be prevented from being influenced by EMI or the like.

As described above, if mutual transmission of the SPDIF signals is possible, when copyright protection is performed by DTCP or the like, the authentication and key exchange processing (see FIG. 22) may be performed between the source device 110B and the sync device 120B by using mutual transmission of the SPDIF signals. In this case, for example, user information X to Z of user data shown in FIG. 11D may be used, so authentication, key exchange, and the like for copyright protection can be performed.

In the channel status format based on the SPDIF standard, as shown in FIG. 10, the 0th bit of the fifth byte may be used as a bi-directional communication bit which indicates whether bi-directional communication is possible or not. That is, in the channel status of the SPDIF signal from the sync device 120B, when the 0th bit of the fifth byte is "1", it means that the source device 110B can transmit the SPDIF signal to the sync device 120B.

When the bi-directional communication bit in the channel status of the SPDIF signal received from the sync device 120B is "1", the source device 110B transmits the SPDIF signal in response to this bit. Therefore, the sequence of bi-directional communication in the HDMI cable 130 starts.

In the channel status of the SPDIF signal from the sync device 120B, when the 0th bit of the fifth byte is "0", it means that the source device 110B may not transmit the SPDIF signal to the sync device 120B.

4. Modification

In the AV system 100B of FIGS. 26 and 27, the example where the clock signal synchronized with the SPDIF signal is transmitted from the transmission side of the SPDIF signal to the reception side, together with the SPDIF signal has been described. However, like the AV system 100B of FIGS. 26 and 27, when bi-directional transmission of the SPDIF signals is possible, the transmission side of the SPDIF signal may perform the transmission operation by the clock signal from the reception side, similarly to the AV system 100A of FIGS. 23 and 24.

A case may be considered where analog sound data is input to the source side and digitally transmitted to the sync side for reproduction. In this case, a clock is transmitted from the sync-side to the source side, and the source side converts analog sound data into digital data by using the clock signal and transmits digital data to the sync side. When this happens, the sync side can convert digital data into an analog signal by the clock synchronized A/D conversion on the source side. Therefore, the analog sound signal input to the source side can be transmitted to the sync side with high quality for reproduction.

While in the foregoing embodiments, the description has been made assuming that the interface based on the HDMI standard is used as the transmission path connecting the respective devices, the invention may be applied to other similar transmission standards.

The invention may be applied to any AV system in which a source device and a sync device are connected to each other through an HDMI cable, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An interface circuit comprising:
a first transmitting section transmitting a first signal as an in-phase signal to an external device through a transmission path; and
a second transmitting section transmitting a clock signal, which is synchronized with the first signal to be transmitted by the first transmitting section, as a differential signal to the external device through the transmission path,
in which the clock signal is reproducible by the external device without use of a phase lock loop (PLL),
the transmission path is a twisted pair formed by a reserve line and a hot plug detect line of a high-definition multimedia interface cable.

2. The interface circuit according to claim 1, further comprising:
a transmitting/receiving section transmitting a second signal as a second differential signal to the external device through the transmission path and processing a third differential signal, which is received from the external device through the transmission path, so as to receive the second signal,
wherein the second transmitting section transmits the clock signal when the transmitting/receiving section does not transmit or receive the second signal.

3. The interface circuit according to claim 1, further comprising:
a first receiving section processing a second in-phase signal, which is received from the external device through the transmission path, so as to receive the first signal; and
a second receiving section processing a second differential signal, which is received from the external device through the transmission path, so as to receive the clock signal, which is synchronized with the first signal to be received by the first receiving section.

4. An interface circuit comprising:

a first receiving section processing an in-phase signal, which is received from an external device through a transmission path, so as to receive a first signal; and a second receiving section processing a differential signal, which is received from the external device through the transmission path, so as to receive a clock signal, which is synchronized with the first signal to be received by the first receiving section, in which the clock signal is obtained by the second receiving section without use of a phase lock loop (PLL)), the transmission path is a twisted pair formed by a reserve line and a hot plug detect line of a high-definition multimedia interface cable.

5. The interface circuit according to claim 4, further comprising:

a transmitting/receiving section transmitting a second signal as a second differential signal to the external device through the transmission path and processing a third differential signal, which is received from the external device through the transmission path, so as to receive the second signal, wherein the second receiving section receives the clock signal when the transmitting/receiving section does not transmit or receive the second signal.

* * * * *